US006906324B1

(12) United States Patent
Wang et al.

(10) Patent No.: US 6,906,324 B1
(45) Date of Patent: Jun. 14, 2005

(54) APPARATUS AND METHOD FOR ANALYZING SAMPLES IN A DUAL ION TRAP MASS SPECTROMETER

(75) Inventors: Yang Wang, Bedford, MA (US); Melvin A. Park, Billerica, MA (US); Ulrich Geissmann, Arlington, MA (US)

(73) Assignee: Bruker Daltonics Inc., Billerica, MA (US)

( * ) Notice: Subject to any disclaimer, the term of this patent is extended or adjusted under 35 U.S.C. 154(b) by 77 days.

(21) Appl. No.: 10/672,933

(22) Filed: Sep. 26, 2003

Related U.S. Application Data

(63) Continuation of application No. 09/798,393, filed on Mar. 2, 2001, now Pat. No. 6,627,883.

(51) Int. Cl.[7] .................................... B01D 59/44

(52) U.S. Cl. ........................ 250/292; 250/287; 250/288

(58) Field of Search ................................ 250/287, 288, 250/292

(56) References Cited

U.S. PATENT DOCUMENTS 6,507,019 B2 * 1/2003 Chernushevich et al. ... 250/287

* cited by examiner

*Primary Examiner*—John Lee
*Assistant Examiner*—Paul M. Gurzo
(74) *Attorney, Agent, or Firm*—Ward & Olivo

(57) ABSTRACT

The present invention is an improved apparatus and method for mass spectrometry using a dual ion trapping system. In a preferred embodiment of the present invention, three "linear" multipoles are combined to create a dual linear ion trap system for trapping, analyzing, fragmenting and transmitting parent and fragment ions to a mass analyzer—preferably a TOF mass analyzer. The dual ion trap according to the present invention includes two linear ion traps, one positioned before an analytic quadrupole and one after the analytic multipole. Both linear ion traps are multipoles composed of any desired number of rods—i.e. the traps are quadrupoles, pentapoles, hexapoles, octapoles, etc. Such arrangement enables one to maintain a high "duty cycle" while avoiding "memory effects" and also reduces the power consumed in operating the analyzing quadrupole.

45 Claims, 11 Drawing Sheets

| | |
|---|---|
| INSTRUM | BioTOF-Lite NT |
| OpId | tof |
| SMPNAM | BioTOF Sample |
| AQ_DATE | Tue Oct 17 12:57:34 2000 |
| OS9PATH | /h0/t/data |
| POLARI | NEG |
| AQOP_m | Reflector |
| TD | 203567 |
| NoSHOTS | 500 |
| SMONUM | 0 |
| SMOPTS1 | 0 |
| SMOPTS2 | 0 |
| SMOPTS3 | 0 |
| DW | 2.00 (us) |
| AccE | 0.00 (kV) |
| ReflE | 7.90 (kV) |
| RefFull | 7.90 (kV) |
| UdetL | 0.00 (kV) |
| UdetR | 1.80 (kV) |
| Udef1 | 2.00 (kV) |
| PULSREP | 3.00 (Hz) |
| ML1 | 6687.800 |
| ML2 | 444.856 |
| ATTEN | 0.0 |
| Parent | 1047.20 (us) |
| PULSTART1 | 0.00 (us) |
| PULSDUR0 | 0.00 (us) |
| PULSDUR1 | 0.00 (us) |
| CMT1 | Do you really want it? |
| CMT2 | Do you really want 2 lines? |

APPARATUS AND METHOD FOR ANALYZING SAMPLES IN A DUAL ION TRAP MASS SPECTROMETER

CROSS-REFERENCE TO RELATED APPLICATIONS

This application is a continuation of application Ser. No. 09/798,393 filed Mar. 2, 2001, now U.S. Pat. No. 6,627,883.

TECHNICAL FIELD OF THE INVENTION

The present invention relates generally to an apparatus and method for a dual ion trap mass spectrometer. More specifically, an apparatus is described which, using a dual ion trap system, analyzes parent ion masses, by temporarily trapping ions generated by an ion source in a first ion trap and gating the sample ions into an analytical multipole for selection. Once selected, the ions of interest are then transported into a second ion trap, which is preferably a collision chamber, to undergo fragmentation. The fragmented ions are then forced out of the collision chamber for mass analysis in, for example, a time-of-flight mass spectrometer.

BACKGROUND OF THF PRESENT INVENTION

The present invention relates to a dual ion trap apparatus for use in a mass spectrometer, and a method for its use in mass analysis of sample ions. The apparatus and method for analyzing sample ions described herein are enhancements of the techniques that are referred to in the literature relating to mass spectrometry. Mass spectrometry is a systematic method that involves the analysis of gas-phase ions produced from a particular sample. The produced ions are then separated according to their mass-to-charge ratio. This separation process is similar to the dispersion of light through a prism according to the wavelength. Since the behavior of charged particles in electric and magnetic field is known, the sample ions' trajectories can be measured, and the ions' respective mass can be determined. For example, a magnetic sector analyzer subjects ions to a magnetic field which disperses the ions according to their mass-to-charge ratio.

Mass spectrometry plays an important role in determining the molecular weight of sample chemical compounds. Analyzing samples using mass spectrometry consists of three steps—formation of gas phase ions from sample material, separation and analysis of ions according to ion mass, and detection of the ions. There are several methods in which mass spectrometry can be performed.

Mass analysis, for example, can be performed through magnetic (B) or electrostatic (E) analysis. Ions passing through a magnetic or electrostatic field follow a curved path. The path's curvature in a magnetic field indicates the momentum-to-charge ratio of the ion. In an electrostatic field, the curvature of the path will be indicative of the energy-to-charge ratio of the ion. Using magnetic and electrostatic analyzers consecutively determines the momentum-to-charge and energy-to-charge ratios of the ions, and the mass of the ion will thereby be determined. Other mass analyzers are the quadrupole (Q), the ion cyclotron resonance (ICR), the Time-of-Flight (TOF), and the quadrupole ion trap analyzers. The analyzer, which accepts ions from the ion guide described here, may be any of a variety of these.

Before mass analysis can begin, however, gas phase ions must be formed from sample material. If the sample material is sufficiently volatile, ions may be formed by electron ionization (EI) or chemical ionization (CI) of the gas phase sample molecules. For solid samples (e.g. semiconductors, or crystallized materials), ions can be formed by desorption and ionization of sample molecules by bombardment with high energy particles. Secondary ion mass spectrometry (SIMS), for example, uses keV ions to desorb and ionize sample material. In the SIMS process a large amount of energy is deposited in the analyte molecules. As a result, fragile molecules will be fragmented. This fragmentation is undesirable in that information regarding the original composition of the sample—e.g., the molecular weight of sample molecules—will be lost.

For more labile, fragile molecules, other ionization methods now exist. The plasma desorption (PD) technique was introduced by Macfarlane et al. in 1974 (Macfarlane, R. D.; Skowronski, R. P.; Torgerson, D. F., *Biochem. Biophys. Res Commoun.* 60 (1974) 616). Macfarlane et al. discovered that the impact of high energy (MeV) ions on a surface, like SIMS would cause desorption and ionization of small analyte molecules, however, unlike SIMS, the PD process results also in the desorption of larger, more labile species—e.g., insulin and other protein molecules.

Lasers have been used in a similar manner to induce desorption of biological or other labile molecules. See, for example, VanBreeman, R. B.: Snow, M.: Cotter, R. J., *Int. J. Mass Spectrom. Ion Phys.* 49 (1983) 35; Tabet, J. C.; Cotter, R. J., *Anal. Chem.* 56 (1984) 1662; or Olthoff, J. K.; Lys, I.: Demirev, P.: Cotter, R. J., *Anal. Instrument.* 16(1987) 93. Cotter et al. modified a CVC 2000 time-of-flight mass spectrometer for infrared laser desorption of involatile biomolecules, using a Tachisto (Needham, Mass.) model 215G pulsed carbon dioxide laser. The plasma or laser desorption and ionization of labile molecules relies on the deposition of little or no energy in the analyte molecules of interest. The use of lasers to desorb and ionize labile molecules intact was enhanced by the introduction of matrix assisted laser desorption ionization (MALDI) (Tanaka, K.; Waki, H.; Ido, Y.; Akita, S.; Yoshida, Y.; Yoshica, T., *Rapid Commun. Mass Spectrom.* 2 (1988) 151 and Karas, M.; Hillenkarnp, F., *Anal. Chem.* 60 (1988) 2299). In the MALDI process, an analyte is dissolved in a solid, organic matrix. Laser light of a wavelength that is absorbed by the solid matrix but not by the analyte is used to excite the sample. Thus, the matrix is excited directly by the laser, and the excited matrix sublimes into the gas phase carrying with it the analyte molecules. The analyte molecules are then ionized by proton, electron, or action transfer from the matrix molecules to the analyte molecules. This process, MALDI, is typically used in conjunction with time-of-flight mass spectrometry (TOFMS) and can be used to measure the molecular weights of proteins in excess of 100,000 Daltons.

Atmospheric pressure ionization (API) includes a number of methods. Typically, analyte ions are produced from liquid solution at atmospheric pressure. One of the more widely used methods, known as electrospray ionization (ESI), was first suggested by Dole et al. (M. Dole, L. L. Mack, R. L. Hines, R. C. Mobley, L. D. Ferguson, M. B. Alice, *J. Chem. Phys.* 49, 2240, 1968). In the electrospray technique, analyte is dissolved in a liquid solution and sprayed from a needle. The spray is induced by the application of a potential difference between the needle and a counter electrode. The spray results in the formation of fine, charged droplets of solution containing analyte molecules. In the gas phase, the solvent evaporates leaving behind charged, gas phase, analyte ions. Very large ions can be formed in this way. Ions as large as 1 MDa have been detected by ESI in conjunction with mass spectrometry (ESMS).

Many other ion production methods might be used at atmospheric or elevated pressure. For example, MALDI has recently been adapted by Victor Laiko and Alma Burlingame to work at atmospheric pressure (Atmospheric Pressure Matrix Assisted Laser Desorption Ionization, poster #1121, $4^{th}$ International Symposium on Mass Spectrometry in the Health and Life Sciences, San Francisco, Aug. 25–29, 1998) and by Standing et al. at elevated pressures (Time of Flight Mass Spectrometry of Biomolecules with Orthogonal Injection+Collisional Cooling, poster #1272, $4^{th}$ International Symposium on Mass Spectrometry in the Health and Life Sciences, San Francisco, Aug. 25–29, 1998; and Orthogonal Injection TOFMS *Anal. Chem.* 71(13), 452A (1999)). The benefit of adapting ion sources in this manner is that the ion optics and mass spectral results are largely independent of the ion production method used.

An elevated pressure ion source always has an: ion production region (wherein ions are produced) and an ion transfer region (wherein ions are transferred through differential pumping stages and into the mass analyzer). The ion production region is at an elevated pressure—most often atmospheric pressure—with respect to the analyzer. The ion production region will often include an ionization "chamber". In an ESI source, for example, liquid samples are "sprayed" into the "chamber" to form ions.

Once the ions are produced, they must be transported to the vacuum for mass analysis. Generally, mass spectrometers (MS) operate in a vacuum between $10^{-4}$ and $10^{-10}$ torr depending on the type of mass analyzer used. In order for the gas phase ions to enter the mass analyzer, they must be separated from the background gas carrying the ions and transported through the single or multiple vacuum stages.

The use of multipole ion guides has been shown to be an effective means of transporting ions through vacuum. Publications by Olivers et al. (Anal. Chem, Vol. 59, p. 1230–1232, 1987), Smith et al. (Anal. Chem. Vol. 60, p. 436–441, 1988) and U.S. Pat. No. 4,963,736 (1990) have reported the use of an AC-only quadrupole ion guide to transport ions from an API source to a mass analyzer. A quadrupole ion guide operated in RF only mode, configured to transport ions is described by Douglas et al. in U.S. Pat. No. 4,963,736. Multipole ion guides configured as collision cells are operated in RF only mode with a variable DC offset potential applied to all rods. Thomson et al., U.S. Pat. No. 5,847,386 describes a quadrupole configured to create a DC axial field along its axis to move ions axially through a collision cell, inter alia, or to promote dissociation of ions (i.e., by Collision Induced Dissociation (CID)).

Other schemes are available, which utilize both RF and DC potentials in order to facilitate the transmission of ions of a certain range of m/z values. For example, Morris et al., in H. R. Morris et al., High Sensitivity Collisionally-Activated Decomposition Tandem Mass Spectrometry on a Novel Quadrupole/Orthogonal-acceleration Time-of-Flight Mass Spectrometer, Rapid Commun. Mass Spectrom. 10, 889 (1996), uses a series of multipoles in their design, one of which is a quadrupole. The quadrupole can be run in a "wide bandpass" mode or a "narrow bandpass" mode. In the wide bandpass mode, an RF-only potential is applied to the quadrupole and ions of a relatively broad range of m/z values are transmitted. In narrow bandpass mode both RF and DC potentials are applied to the quadrupole such that ions of only a narrow range of m/z values are selected for transmission through the quadrupole. In subsequent multipoles the selected ions may be activated towards dissociation. In this way the instrument of Morris et al. is able to perform MS/MS with the first mass analysis and subsequent fragmentation occurring in what would otherwise be simply a set of multipole ion guides.

Ion guides similar to that of Whitehouse et al. U.S. Pat. No. 5,652,427 (1997), use multipole RF ion guides to transfer ions from one pressure region to another in a differentially pumped system. Ions are produced by ESI or APCI at substantially atmospheric pressure, and transferred from atmospheric pressure to a first differential pumping region by the gas flow through a glass capillary. An elevated pressure ion source has both an ion production region and an ion transfer region. The ion production region operates at an elevated pressure—most often atmospheric pressure—with respect to the analyzer. Then, Ions are transferred from this first pumping region to a second pumping region through a "skimmer" by an electric field between these regions. A multipole in the second differentially pumped region accepts ions of a selected mass-to-charge (m/z) ratio and guides them through a restriction and into a third differentially pumped region. This is accomplished by applying AC and DC voltages to the individual poles. An ion production region often includes an ionization chamber. In an ESI source, for example, liquid samples are "sprayed" into the "chamber" to form ions.

In the scheme of Whitehouse et al. U.S. Pat. No. 5,652,427 (1997), an RF only potential is applied to the multipole. As a result, the multipole is not "selective," but transmits ions over a broad range of mass-to-charge (m/z) ratios, adequate for many applications. However, for some applications—particularly with MALDI—the ions produced may be well out of this range. Ions with high m/z ratios, such those produced by MALDI ionization, are often out of the range of transmission of prior art multipoles.

Thus, electric voltages applied to the ion guide are conventionally used to transmit ions from an entrance end to and exit end. Analyte ions produced in the ion production region enter at the entrance end. Through collisions with gas in the ion guide, the kinetic energy of the ions is reduced to thermal energies. Simultaneously, the RF potential on the poles of the ion guide forces ions to the axis of the ion guide. Then, ions migrate through the ion guide toward its exit end.

In the Whitehouse patent, two or more ion guides in consecutive vacuum pumping stages are incorporated to allow different DC and RF values. However, losses in ion transmission efficiency may occur in the region of static voltage lenses between ion guides. A commercially available API/MS instrument manufactured by Hewlett Packard incorporates two skimmers and an ion guide. An interstage port (also called Drag stage) is used to pump the region between skimmers. That is, an additional pumping stage/region is added without the addition of an extra turbo pump, which results in better pumping efficiency. In this dual skimmer design, there is no ion focusing device between skimmers, causing ion losses when gases are pumped away. Another commercially available API/MS instrument manufactured by Finnigan applies an electrical static lens between a capillary and a skimmer to focus an ion beam. Since Finnigan's instrument has a narrow mass range of the static lens, the instrument may need to scan the voltage to optimize the ion transmission.

Previous combined or hybrid multipole (such as quadrupole, hexapole, octopole, etc.) time-of-flight mass spectrometers (TOFMS) include three types: 1) a flow-type quadrupole TOFMS; 2) an ion trap TOFMS; 3) single linear multipole (such as a quadrupole, hexapole, octopole, etc.) TOFMS. The flow-type quadrupole TOFMS utilizes the method with ions generated in an ion source (Electrospray, Matrix Assisted Laser Desorption/Ionization (MALDI). Ions then flow through a multipole ion guide, an analytic quadrupole selects ions by selecting ions that have a particular mass to charge ratio, and the ions are fragmented in a collision chamber (quadrupole, hexapole, octopole, etc.). The fragmented ion mass is then analyzed in a TOF mass spectrometer. An example of such a mass spectrometer is described in Bateman et al. U.S. Pat. No. 6,107,623. This type of mass spectrometer does not have means for trapping ions.

Ion trapping is an advantageous method for improving the performance of a mass analyzer by maintaining a high "duty cycle"—i.e., ion transmission efficiency—while at the same time minimizing any "memory effect"—i.e., signal from a first experiment appearing in a spectrum from a second experiment. As discussed herein, the effective efficiency of transmission of ions from the ion production region to a mass analyzer can be improved by trapping ions in a multipole and then releasing the ions in a pulsed manner to a mass analyzer. However, ion trap TOF mass spectrometry is not new. Previous ion trap TOF mass spectrometers include an ion source (e.g., Electrospray, Matrix Assisted Laser Desorption/Ionization (MALDI), LC, etc.) to generate ions and introduce the ions into mass analyzer through a plurality of differentially pumped regions using, for example, ion guides. Prior to the TOF analysis region, an ion trap is positioned to trap the ions. Trapping the ions, among other things, allows for selection of only the ions to be analyzed. After ion mass-selection and/or fragmentation (e.g., using a collision cell, etc.), a TOF mass spectrometer (or some other type of analyzer) analyzes the fragment ion masses.

Such an ion trap TOF mass spectrometer is disclosed in Franzen U.S. Pat. No. 5,763,878. For example, FIG. 1 shows a time-of-flight mass spectrometer including an external electrospray ion source 1, a differential pump unit (not shown), an ion guide 8, and an ion trap 12. Ion source 1 introduces a sample spray into the entrance of capillary 3. The ions enter through capillary 3, together with ambient air into first pumping region 4, which is connected via flange 17 to a differential pump unit. The ions are then accelerated toward skimmer 5 where the ions enter second pumping region 7, which is connected via flange 18 to a high vacuum pump unit. In second pumping region 7 the ions are accepted by ion guide 8 which leads through pumping restriction 9 into a third pumping region 15, which is connected to a high vacuum pump via flange 16. Here, the ions enter ion trap 12, which has at either end thereof apertured electrodes 10 and 14. These electrodes enclose the ions within ion trap 12. Ion trap 12 is enclosed on its top by ion repeller electrode 11 and on its bottom by drawing out electrode 13, which serve to accelerate the outpulsed ions. The trapped ions are then accelerated into flight tube 19 of the mass spectrometer., the arrow indicates the flight direction in the time-of-flight spectrometer.

Ion trap 12 consists of a multipole arrangement and two end apertured electrodes 10 and 14. Apertured electrodes 10 and 14 serve simultaneously as holders for the pole rods, by means of small insulators. To fill ion trap 12, the potential on entrance electrode 10 is lowered. Ions which have not yet been thermalized have even stronger oscillations perpendicular to the axis of the ion guide, and are only allowed through in limited numbers. The apertured electrode 14 has a much larger aperture than electrode 10 (i.e., about 2.5 mm), and is switched in such a way that only thermal ions are held back. In this way, the few non-thermal ions which penetrate through apertured electrode 10 leave ion trap 12 again through electrode 14. Moreover, ion trap 12 may be designed as a hexapole or quadrupole. According to Franzen, an embodiment as an octopole is not advantageous, since the ions are then no longer definitely arranged in one area in the form of a thin thread, but are rather able to occupy a more extensive area due to space charge. Therefore during the outpulsing, they are all disadvantageously not at uniform potential.

A similar arrangement is also disclosed by Whitehouse et al. in U.S. Pat. No. 6,011,259. FIGS. 2 and 3 depict a TOF mass spectrometer according to Whitehouse. Shown are TOF mass analyzers configured with multipole ion guide(s) in the ion path between the ion source and pulsing region of the mass analyzer, which enables trapping or transmission of ions from an atmospheric pressure ion source. The mass-to-charge (m/z) range of ions transmitted through or trapped in the ion guide can be mass selected. For example, ions with stable trajectories can undergo Collisional Induced Dissociation (CID), and during ion fragmentation, the ion guide potentials can be set to transmit or trap fragment ions produced by CID. Then, the parent and/or fragment ions may be delivered from the ion guide to the pulsing region of the TOF mass analyzer for mass analysis. After the first fragmentation step, the ion guide potentials can again be set to select a narrow rn/z range to clear the ion guide in trapping mode of all but a selected set of fragment ions. Mass-to-charge selection and ion fragmentation can be repeated a number of times with mass analysis occurring at the end of all the MS/MS$^n$ steps or at various times during the MS/MS$^n$ stepwise process. Also, the ion guide/trap is such that it may reside in one vacuum pumping stage or can extend continuously into more than one vacuum pumping stage.

According to Whitehouse et al., "trapping of ions in the multipole ion guide (as shown in FIG. 2) with subsequent release of ions into pulsing region 30 can be achieved by one of two methods. Due to collisional cooling of ions with the neutral background gas particularly in the high pressure region at entrance region 59 of ion guide 46 shown in FIG. 2, the kinetic energy of ions traversing the ion guide is greatly reduced from the energy spread of ions which exit skimmer orifice 43. Typically the total ion energy spread for ions leaving ion guide 46 after a single pass is less than 1 ev over a wide range of m/z values. Due to this kinetic energy collisional damping, the average energy of ions in ion guide 46 becomes common DC offset potential applied equally to all ion guide rods 20. For example, if ion guide 46 has an offset potential of 10 ev relative to ground, then the ions exiting ion guide 46 at exit end 24 will have an average kinetic energy of approximately 10 ev relative to ground potential. FIG. 2 shows an enlargement of multipole ion guide 46 and pulsing region 30. The first and simplest way to trap ions in ion guide 46 is by raising the voltage applied to lens 26 high enough above the offset potential applied to ion guide 46 to insure that ions are unable to leave the ion guide RF field at exit end 24 and are reflected back along ion guide 46 towards entrance end 59. The voltage applied to skimmer 44 is set higher than the ion guide offset potential to accelerate and focus ions into the ion guide. Consequently, ions traveling back from exit end 24 towards entrance end 59 are prevented from leaving the entrance end by the higher skimmer potential and the neutral gas stream flowing through skimmer orifice 43 into entrance end 59 of ion guide 46. In this manner, ions 50 with m/z values that fall within the ion guide stability window are trapped in ion guide 46. Ions are released from the ion guide by lowering the voltage on lens 26 for a short period of time and then raising the voltage to trap the remaining ions in ion guide 46. The disadvantage of this simple trapping and release sequence is that released ions that are still between lens 26 and 27 are accelerated to potentials higher that the average ion energy when the voltage on lens 26 is raised. These higher energy ions are effectively lost.

A second method to achieve more efficient trapping and release is to maintain the relative voltages between capillary exit 32, skimmer 44 and offset potential of ion guide 46 constant. With the relative voltages held constant, all three voltages are dropped relative to the lens 26 voltage to trap ions within ion guide 46. Capillary 37 is fabricated of a dielectric material and the entrance and exit potentials are independent as is described in U.S. Pat. No. 4,542,293. Consequently, the exit potential of capillary 37 can be changed without effecting the entrance voltage. In this manner, the ions which are released from ion guide 46 by simultaneously raising voltages on capillary exit 32, skimmer 44 and the offset potential of ion guide 46 and these ions pass through lens 26 retaining a small energy spread and remain optimally focused into pulsing region 30. After a short time period the three voltages are lowered to retain trapped ions within ion guide 46. A large portion of the released ions between lenses 26 and 27 are unaffected when the offset potential of ion guide 46 is lowered to trap ions remaining in the ion guide internal volume. By either trapping method, ions continuously enter ion guide 46 even while ion packets are being pulsed out exit end 24. The time duration of the ion release from ion guide exit 24 will create an ion packet 52 of a given length as shown in FIG. 2. As this ion packet moves through lenses 27 and 28 into pulsing region 30 some rnlz TOF partitioning can occur. The rn/z components of ion packet 52 can occupy different axial locations in pulsing region 30 such as separated ion packets along the primary ion beam axis. Separation has occurred due to the velocity differences of ions of different m/z values having the same energy. The degree of m/z ion packet separation is in part a function of the initial pulse duration. The longer the time duration that ions are released from exit 24 of ion guide 46, the less m/z separation that will occur in pulsing region 30. All or a portion of ion packet 52 may fit into the sweet spot of pulsing region 30. Ions pulsed from the sweet spot in pulsing region 30 will impinge on the surface of a detector. If desired, a reduced m/z range can be pulsed down flight tube 42 from pulsing region 30. This is accomplished by controlling the length of ion packet 52 and timing the release of ion packet 52 from ion guide 46 with the TOF pulse of lenses 34, 35 and 36. An ion subpacket of lower m/z value has moved outside the sweet spot and will not hit the detector when accelerated down flight tube 42. The longer the initial ion packet 52 the less mass range reduction can be achieved in pulsing region 30. With ion trapping in ion guide 46, high duty cycles can be achieved and some degree of m/z range control in TOF analysis can be achieved independent or complementary to mass range selection operation with ion guide 46. The ion fill level of multipole ion guide 46 operated in trapping mode is controlled by the ion fill rate, stable m/z range selected, the empty rate set by the ion guide ion release time per TOF pulse event and the TOF pulse repetition rate. During continuous ion guide filling, m/z selective CID fragmentation can be performed within ion guide 46, with high duty cycle TOF mass analysis."

An alternative embodiment of the ion guide of Whitehouse is shown in FIGS. 3. Specifically, the ion guide and TOF pulsing region of a four vacuum stage API orthogonal pulsing TOF mass analyzer is shown. Here, multiple ion guide 60 is located entirely in the second vacuum pumping stage 62, while a second multipole ion guide 61 is located entirely in the third vacuum pumping stage 63. Electrostatic lens 64 positioned between ion guides 60 and 61 serves as a vacuum stage partition between vacuum stages 62 and 63 and as an ion optic element separating ion guides 60 and 61. Ions produced in an ion source enter the first vacuum stage 67 through capillary exit 66. A portion of these ions continue through skimmer orifice 68 and enter multipole ion guide 60 at its entrance end 74. Operating in single pass continuous beam mode, ions pass through ion guide 60, lens orifice 65, ion guide 61 and exit lens 71, where the ions are accelerated by accel. Electrodes 72 into TOF orthogonal pulsing region 70 where they are pulsed into flight tube 73 and mass analyzed. Ion transfer between ion guides 60 and 61 through electrostatic lens 64 may not be as efficient as that achieved with a multiple vacuum stage multipole ion guide, but according to Whitehouse, some similar MS/MS functional capability can be achieved with the embodiment diagrammed in FIG. 3. For example, in the configuration shown in FIG. 3 ion guide 60 may be operated in trapping mode. Due to the higher pressure in ion guide 60 as opposed to in ion guide 61 and using techniques such as resonant frequency excitation, ion fragmentation can occur due to CID of ions with the neutral background gas within ion guide 60. Voltages can be applied independently to ion guides 60 and 61, so that both ion guides can be operated in either trapping or transmission modes. This flexibility allows some variation in functional step sequences in acquiring MS/MS data from those for a multiple vacuum stage multipole ion guide.

For example, with the two ion guide configuration shown in FIG. 3, ion guide 60 can be operated in a wide m/z range trapping mode and ion guide 61 in a m/z selective trapping mode. The trapped ions in ion guide 61 can be accelerated back into ion guide 60 through lens orifice 65 by increasing the offset voltage of ion guide 61 relative to the offset potential of ion guide 60. Ions traversing ion guide 60 moving in the reverse direction towards entrance end 74, collide with neutral background molecules. In this manner rn/z selective ion fragmentation with higher energy CID can be achieved. A second example of a function variation using the embodiment shown in FIG. 3 creates the ability to perform selected ion—ion reaction monitoring. To perform this analysis, both ion guides are operated in trapping mode with different m/z range selection chosen for each ion guide. A fragmentation experiment can be run in ion guide 60 without changing the ion population in ion guide 61. The different ion populations from both in guides can then be recombined by acceleration of ions from one ion guide into the other to check for ion reactions before acquiring TOF mass spectra of the mixed ion population.

Next, as shown in FIG. 4, Dresch U.S. Pat. No. 6,020,586 discloses a method and an apparatus which combines at least one linear two dimensional ion guide 91 or a two dimensional ion storage device (not shown) in tandem with a time-of-flight mass analyzer to analyze ionic chemical species 87 generated by ion source 82. According to Dresch, the method improves the duty cycle, and therefore, the overall instrument sensitivity with respect to the analyzed chemical species. Ions are first introduced from ion source 82 through skimmer 99 into first region 81. Application of certain potentials to skimmer 99 and exit lens 85 may trap ions in ion storage region 92. As the voltage on the exit lens 85 is switched from a first level to a second level for a short duration (on the order of microseconds), high density ion bunches are extracted collision free from the low pressure storage region 92 and injected into the orthogonal time-of flight analyzer. As shown, the ions are subsequently accelerated and focused by application of constant value voltages to additional electrodes 86 and 88 where the ions are then orthogonally accelerated into the time-of-flight region for mass analysis.

Similarly, Benjamin M. Chen and David M. Lubman disclose an ion trap storage/reflection time-of-flight mass spectrometer (IT/reTOF) and method for rapid structural analysis of low levels of peptides with relatively high resolution. Lubman et al., "Analysis of the Fragments from Collision-induced Dissociation of Electrospray-Produced Peptide Ions Using a Quadrupole Ion Trap Storage/Reflection Time-of-Flight Mass Spectrometer," Anal. Chem. 1994, 66, 1630–1636. As discussed by Lubman et al., the fragmentation generated by collision-induced dissociation (CID) of electrospray-produced ions of peptides between the capillary exit and the skimmer of the electrospray source is analyzed by the IT/reTOF.

Lubman et al. disclose an apparatus consisting of a differentially pumped reflectron time-of-flight mass spectrometer interfaced to a quadrupole ion trap storage device and an electrospray sample ionization source. A syringe pump is used to deliver the sample through a capillary into an electrospray assembly where the sample is ionized. The ions produced were then sampled through an inlet capillary to desolvate the droplets. The remaining ions were injected into a differentially pumped region (~1.2 Torr) where the on-axis component of the ion beam passed through a skimmer into the mass spectrometer region and was collimated by a set of Einzel lens into the ion trap device. The ions were stored or accumulated until an extraction pulse was applied to the exit end cap of the ion trap. This extraction pulse ejected the ions from the trap and triggered the start for the TOF mass analysis. Upon leaving the trap, the ion packet entered a field-free drift region ~1 m long at the end of which its velocity was slowed and reversed in direction by the reflector. The newly focused ion packet then retraversed the drift region and was detected by a detector.

Lubman et al. demonstrate that the spectra obtained are similar but different than those obtained in triple quadrupole and hybrid devices and that important information is obtained for structural analysis. Most significantly though, it is shown that the isotropic distribution of the fragment ions including even multiply charged ions can be resolved with a resolution approaching that of the molecular ion, thus providing identification of the charged state. The resolution obtained for fragment ions is enhanced by the use of a buffer gas and the storage capabilities of the trap. In addition, it is demonstrated that for these CID spectra such resolution can be obtained on low picomole samples on this relatively simple, inexpensive instrument.

Whitehouse U.S. Pat. No. 5,689,111 discloses a single linear multipole TOF mass spectrometer, which uses a method where ions generated by an ion source (Electrospray, Matrix Assisted Laser Desorption/Ionization (MALDI)) flow through a multipole ion guide into an analytical quadrupole, which mass-selects the desired ions. A collision chamber (e.g., quadrupole, hexapole, octopole, etc.) is then used to fragment the ions for analysis in a TOF mass spectrometer.

Also, Whitehouse, in U.S. Pat. No. 6,121,607, a multipole ion guide 102 configured to improve the transmission efficiency of ions that traverse the length of ion guide 102 is disclosed. Such a multipole ion guide 102 is shown in FIG. 5. Specifically, FIG. 5 depicts rods 142 at the exit end 110 of multipole ion guide 134 surrounded by hat shaped exit lens 118, which forms a vacuum partition with insulator 122 and vacuum chamber partition 126 between vacuum stages 124 and 108. The face 112, 114 of exit lens 118 is located even with or just inside the plane set by the face 116 of multipole rods 102. Multipole rods 102, which comprise RF sections 104, are positioned around ion guide exit lens 118, multipole rods 142 of multipole ion guide 134 and insulator 122. Insulator 122 surrounds exit lens tube section 130 preventing multipole ion guide 134 and exit lens 118 from electrically contacting RF sections 104 of multipole 102. In this embodiment, the ion guide 134 centerline 138 is approximately aligned with multipole 102 centerline 106. In practice it has been found that the ion guide and multipole mass analyzer centerline alignment is not critical to achieve efficient ion transmission into multipole 100.

As further disclosed by Whitehouse, ions 138 which traverse ion guide 134 and have m/z values falling within the multipole ion guide operating stability m/z range are trapped radially by the voltages applied to rods 142. But, ions 138 are free to move in the axial direction within ion guide 134. Ions exiting ion guide 134 at exit end 110 will pass through an orifice in hat shaped exit lens 118 into quadrupole 102. Ions 138 are initially focused toward the centerline of quadrupole 102 by setting the relative potentials of the DC offset of ion guide 134, and exit lens 118 and the DC offset potential of quadrupole 102 RF section 104. Thus, ions exiting ion guide 134 along centerline 106, where the net quadrupole 102 AC field strength is low, are initially focused toward centerline 106 by what is effectively a three element electrostatic lens assembly. The RF applied to RF only section 104 continues to focus the ions to centerline 106 whose m/z values are within the stability window. Thus, ion beam 138 exiting exit lens 118 can be focused to a point along the centerline downstream from exit lens 118 where the quadrupole RF field can prevent the beam from diverging after the focal point. Ions exiting through exit lens 118 are initially shielded from the quadrupole RF fringing field defocusing effects by exit lens face 112, 114. As ions move downstream from exit lens 118, the ions are well within the quadrupole rod assembly 102 as the quadrupole RF and DC fields begin to drive the ion trajectories in the radial direction. According to Whitehouse, this embodiment reduces the negative effect of the quadrupole fringing fields for ions transmitted into quadrupole mass analyzer 102. In addition, Whitehouse suggests that operating with the ion transfer optics assembly shown in FIG. 5, higher resolution and higher sensitivity can be achieved when compared to electrostatic ion transfer and focusing lenses and ion guides which do not extend into the downstream ion guides. With such a configuration, ions can be transferred into a three dimensional trap with increased trapping efficiency, even for ions with low kinetic energies.

Despite the disclosed efficiencies and advantages of the Whitehouse method and apparatus, a need still remains for an improved ion trap TOF mass spectrometer having a high "duty cycle" (i.e., ion transmission efficiency), while minimizing any "memory effects" (i.e., sgnals from first MS appearing in a spectrum from a second MS). The present invention provides such a means and method, as discussed in further detail herein below.

SUMMARY OF THE INVENTION

The present invention is an improved apparatus and method for mass spectrometry using a dual ion trapping system. In a preferred embodiment of the present invention, three "linear" (but not necessarily straight) multipoles are combined to create a dual linear ion trap system for trapping, analyzing, fragmenting and transmitting parent and fragment ions to a mass analyzer—preferably a TOF mass analyzer—from a pulsed or continuous ion source. The dual ion trap according to the present invention includes two linear ion traps, one positioned before an analytic multipole and one after the analytic multipole. Both linear ion traps are multipoles composed of any desired number of rods—i.e. the traps are quadrupoles, pentapoles, hexapoles, octapoles, etc. Such arrangement enables one to maintain a high "duty cycle" while avoiding "memory effects" and also reduces the power consumed in operating the analyzing quadrupole.

The apparatus has two modes of operation—"transmission only" and "MSIMS" modes. A first function of the apparatus is to guide ions from the entrance end of the apparatus—essentially the ion production region—to the exit end of the apparatus—at which end a mass analyzer is used to analyze and detect the ions and thereby produce a mass spectrum. In transmission only mode, ions are transmitted from the entrance end to the exit end of the apparatus without analysis or fragmentation. In this mode, only RF potentials are applied between the rods of the multipoles of the apparatus. This RF potential forces ions toward the axis of the multipoles and thereby guides them from the entrance end to the exit end of the apparatus. Further, as described with respect to the prior art, the addition of an appropriate pressure of gas—for example nitrogen—to one or more of the multipoles will tend to reduce the kinetic energy of the ions to the temperature of the added gas—typically room temperature.

In MS/MS mode, the analyzer multipole is used to select ions of a desired mass-to-charge (m/z) ratio for transmission to the second trapping multipole. This is effected by applying a DC potential between the rods of the analyzer multipole in addition to aforementioned RF potential the potential between the rods of the trapping multipoles is in general RF only in either mode of operation. Ions of m/z other than the desired m/z (or m/z range) are filtered out of the ion beam by the analyzer multipole. Selected ions are transmitted to the second trapping multipole which in this mode of operation acts as a collision cell as well as a trap. In MS/MS mode, the second trap (collision cell) is filled with "collision gas" to a pressure of, for example, 0.004 mbar. The DC potential difference between the analyzer multipole and the collision cell is set such that the selected ions are accelerated to a desired kinetic energy as they are transferred to the collision cell. This results in inelastic collisions between the ions and collision gas in the second trap and can thereby lead to the fragmentation of the ions. Subsequent collisions will eventually cool the resultant ions to near the temperature of the collision gas—typically room temperature. In either case, "transmission only" or "MS/MS" modes, ions finally are transmitted from the second trapping multipole to a subsequent mass analyzer—e.g. a TOF mass analyzer.

It is one object of the present invention to maintain a high "duty cycle"—i.e. ion transmission efficiency—while at the same time minimizing any "memory effect"—i.e. signal from a first experiment appearing in a spectrum from a second experiment. As discussed above, the effective efficiency of transmission of ions from the ion production region to a mass analyzer can be improved by trapping ions in a multipole and then releasing the ions in a pulsed manner to a mass analyzer. This is especially true when using a mass analyzer which can accept ions in a pulsed manner—e.g. quadrupole trap, ICR trap, TOF analyzer, etc. Generally, when the analyzer is busy analyzing ions, it cannot accept additional ions. Also, if a multipole trap is not used, then the ion beam from, for example, an electrospray source will be continuous. Thus, if ions are not trapped during the period in which the analyzer is analyzing ions (and cannot accept more ions), then these untrapped ions will be lost.

The potential difficulty with trapping ions is that it is possible for ions from two separate experiments to be present in the trap at the same time. That is, it is possible that ions from a first experiment are not eliminated from the trap (into the mass analyzer) before ions corresponding to a second experiment enter the trap. It is a purpose of the present invention to provide a means and method whereby such cross contamination is avoided. Specifically, a first group of ions corresponding to a first experiment are first trapped in a first multipole. After accumulating this first group of ions for a desired period of time, these ions are released to pass through the analyzer multipole and into a second multipole trap. These ions are released in a pulsed manner, into the mass analyzer (e.g., a TOF analyzer). Either one or several ion pulses might be produced from this first group of ions depending on what type of analyzer is to be used. While the first group of ions is being pulsed out of the second multipole trap, a second group of ions, corresponding to a second experiment, is simultaneously being accumulated in the first multipole trap. Unlike prior art systems, because these ions are being accumulated in a different multipole trap than that occupied by the first group of ions, there can be no cross contamination. After the desired accumulation time has passes, any ions remaining in the second multipole trap are eliminated into the analyzer. Then and only then is the second group of ions transferred from the first multipole trap through the analyzer multipole and into the second multipole trap.

It is a second object of the present invention to reduce the power consumed in the operation of the analyzer multipole. In the preferred embodiment, the analyzer multipole is a quadrupole. Such a quadrupole may be operated at a high voltage—e.g. 8 kVpp—and high frequency—e.g. 880 kHz. This can result in the consumption of considerable electrical power. In operating the analyzer multipole according to the present invention, the analyzer multipole can be "off" when ions are being accumulated. The analyzer multipole electronics need be "on" only when ions are being transferred from the first multipole trap to the second multipole trap. As a result, the operation of the analyzer according to the present invention consumes much less power than prior art systems (in which the analyzer multipole is continuously on). Further, the switching of the multipole settings from one selected m/z ion to another can be accomplished during the relatively long accumulation period. As a result, the switching can be slowed down considerably over prior art designs.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Figure 6:
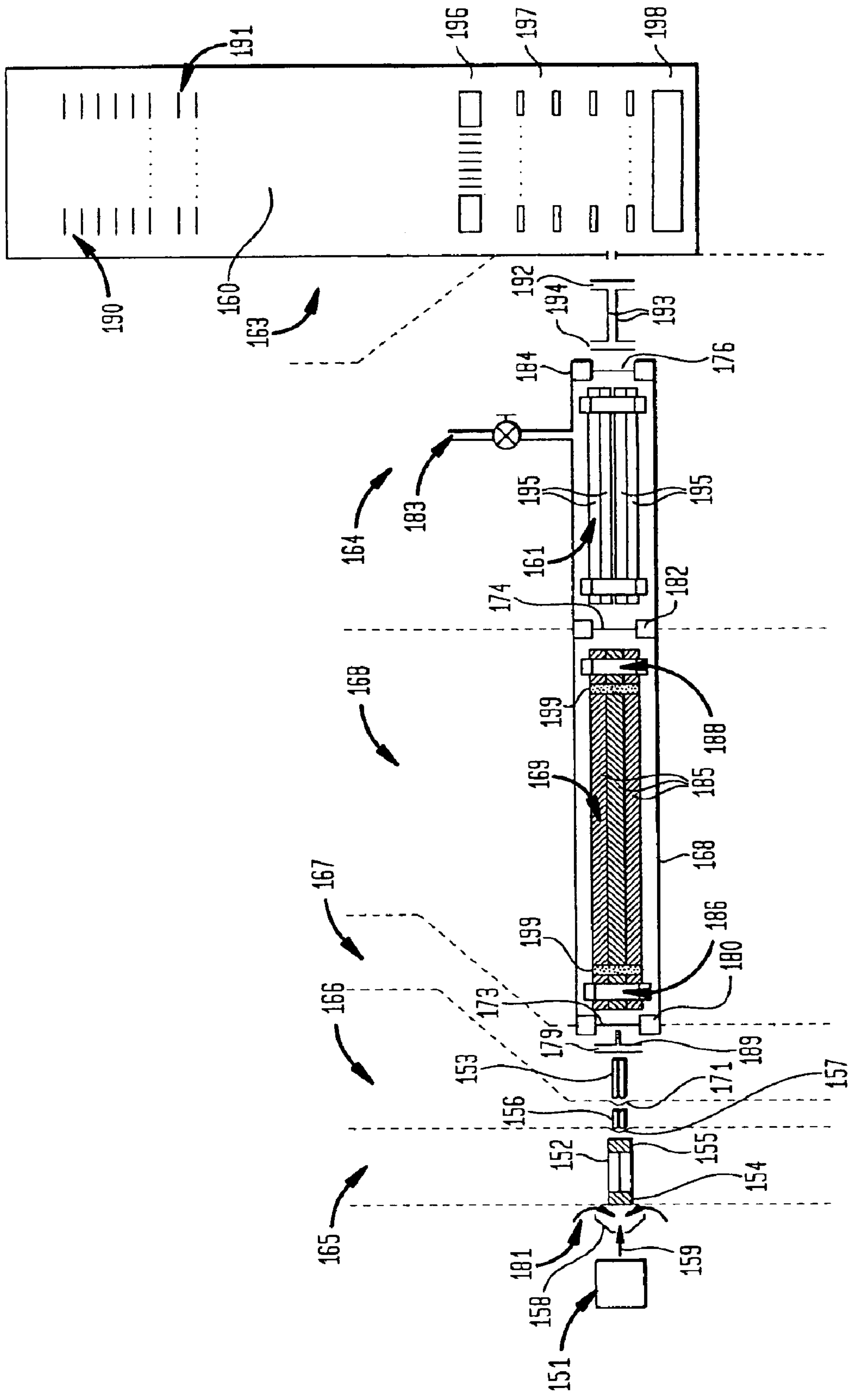
FIG. 6 shows a schematic representation of the preferred embodiment of the dual ion trap mass spectrometer according to the present invention, including first and second ion traps one on either side of an analytical multipole, and wherein the first ion trap is separated from the analytical multipole by an apertured electrode.

Referring first to FIG. 6, shown is the preferred embodiment of the dual ion trap time of flight (TOF) mass spectrometer according to the present invention. As shown, the dual ion trap TOF mass spectrometer preferably comprises an ion source 151, a plurality of pressure regions 164–168, capillary 152 having endcap electrodes at its entrance end 154 and exit end 155, pre-hexapole ion guide 156, skimmers 157 & 171, main hexapole or first ion trap 153, first gating electrode 179, optional focusing optics 189 & 173, analytical multipole 169, second gating electrode 174, second ion trap 161, third gating electrode 176, optional focusing optics 192,193 & 194 and TOF mass analyzer 163.

Ion source 151 is preferably an API source (e.g., electrospray ionization, etc.), although other known ionization source techniques may be used (e.g., Matrix Assisted Laser Desorption/Ionization (MALDI), Electron Ionization (EI), Chemical Ionization (CI), etc.). Also, ion source 151 is depicted as being coaxial with first ion trap 153, although an orthogonal arrangement may be used. Of course, other configurations may be used. For example, additional ion transfer devices and other ion optic devices may be employed between ion source 151 and first ion trap 153 to transfer and further focus the generated ions through one or more pumping restrictions such that they arrive at first ion trap 153 in a significantly reduced pressure region 167. Preferably, differential pumping stages 164–168 and mass analysis region 163 are connected to one or more vacuum pumps (i.e., a roughing pump and/or turbo pump having a drag stage and a main stage). Alternatively, a single pump or pumping system may be used in accordance with the invention.

During operation of the embodiment shown in FIG. 6, ions 159 are generated from an API source (e.g., ESI or APCI) 151, and are introduced into first differential pumping region 165 through an ion transport device such as capillary 152 through an optional electrode cap 158. Endcap electrode 158 is mounted over a sampling orifice at the entrance end 154 of capillary 152 and directs the flow of heated gas 181 (e.g., $N_2$), which is used to assist the drying of the sample spray from ion source 151. The electric potential established between endcap electrode 158, the sampling orifice, and ion source 151 also assists in directing ions into the sampling orifice. Also, endcap electrode 158 may comprise multiple slits (e.g., four, five, six, etc.) extending radially from a central aperture therethrough. These slits may be aligned with, for example, multiple sprayers of the ionization source. Drying gas 181 may then pass through slits from behind endcap electrode 158 towards the respective sprayer or sprayers, for example, of ion source 151 and intercept droplets sprayed from a sprayer. Sample droplets thus may come in contact with heated drying gas 181 for a longer period of time as the sample moves from the exit of the sprayer to the sampling orifice of capillary tube 152 at its entrance end 154 than would be possible using an endcap electrode without any slits. Preferably, entrance end 154 of capillary 152 comprises a metal coating (e.g., nickel, etc.) thereon such that an electric potential may be applied thereto.

After being transported into and through capillary 152, ions 159 exit capillary 152 at its exit end 155, which also preferably comprises a metal coating (e.g., nickel, etc.) thereon such that an electric potential may be applied thereto. Capillary tube 152 is preferably made of an insulating material (e.g., glass, etc.), such that the entrance end 154 and exit end 155 may have different potentials applied thereto. Capillary 152 transports ions from the source region (e.g., at atmospheric pressure) to first pressure region 165. First pumping region 165 is preferably pumped to a pressure lower than atmospheric pressure by a vacuum pump. For example, this region may preferably be pumped to a pressure of approximately 1–2 mbar.

The transported ions enter first pumping region 165 at capillary exit 155, whereupon an electric field directs the ions into and through first skimmer 157 of a multipole ion guide assembly. The electric field may be generated by application of a potential difference across capillary exit 155 and first skimmer 157. This electric field is applied such that the ions are directed toward first skimmer 157, while neutral gas particles are pumped away. Optionally, this electric field may be varied depending on the desired result, the size of the ions being directed, the distance between capillary exit 155 and first skimmer 157, etc. Alternatively, it is envisioned that in certain situations better results may be obtained without application of an electric field across capillary exit 155 and first skimmer 157.

The ions that make it through skimmer 157 then enter second differential pumping region 166, which is further pumped by a vacuum pump (e.g., a turbo molecular drag pump). Preferably, second pumping region 166 is pumped and maintained at a pressure in the range from $1\times10^{-2}$ mbar to $1\times10^{-1}$ mbar. At this point, the surviving ions enter pre-multipole ion guide 156, preferably operated as an RF only ion guide, wherein the ions are further separated from any neutral gas molecules. As described in co-pending application Ser. No. 09/636,321, which is incorporated herein by reference, pre-multipole ion guide 156 comprises a plurality of electrode rods (e.g., four (quadrupole), five (pentapole), six (hexapole), etc.), each having a potential applied thereto such that the resulting electric field "pushes" or forces the ions toward a central axis as the ions continue to move through pre-multipole ion guide 156 toward second skimmer 171 (which leads to third pumping region 167). This allows the ions to pass through second skimmer 171, while the neutral gas molecules, which are not affected by the electrical field, are pumped away. Preferably, pre-multipole ion guide 156 is positioned between first skimmer 157 and second skimmer 171, pre-multipole ion guide 156 being located entirely in second differential pumping region 166. Of course, alternative configurations may be used. For example, pre-multipole ion guide 156 may be positioned to cross from one pumping stage to another, one or both skimmers may be removed, or one or both skimmers may be replaced or supplemented with focusing lenses (e.g., Einsel lenses, etc.).

As ions 159 pass through second skimmer 171, they enter third pumping region 167 and multipole 153. Preferably, third pumping region 167 is pumped to and maintained at a pressure in the range from $1\times10^{-3}$ mbar to $1\times10^{-2}$ mbar. At this point, the surviving ions enter multipole 153, which when operated in transmission mode as an RF only ion guide, further separates the ions from any neutral gas molecules. As described in co-pending application Ser. No. 09/636,321, multipole 153 comprises a plurality of electrode rods, each having an electric potential applied thereto such that the resulting electric field "pushes" or forces the ions toward a central axis of multipole 153. Application of the electric field separates the ions from neutral gas molecules present (which are pumped away because they are not affected by the electrical field). That is, neutral gas molecules will be continuously pumped away by the connected pump (not shown) (e.g., a turbo molecular drag pump). In addition, the introduction or presence of gas in this third pumping region 167 results in the collisional cooling of the ions within multipole 153 as the ions are being "guided" therethrough.

In the preferred embodiment, multipole 153 is operated in trapping mode. In this mode, the surviving ions which enter multipole 153 are trapped within multipole 153 through application of high voltage to gate electrode 179 positioned at the exit end of multipole 153. For example, at the entrance end of multipole 153 skimmer 171 may have a potential of 20 volts, while the potential on multipole 153 is maintained at 15 volts. This potential difference of 5 volts causes the ions 159 to undergo collisional damping within multipole 153, thereby reducing the kinetic energy of ions 159. Thus, application of a potential of 30 volts to gate electrode 179 provides a potential difference of about 15 volts, which causes ions 159 to be reflected back into multipole 153, effectively trapping the ions 159 within multipole 153 until such time when the potential applied to gate electrode 179 is lowered.

In a preferred embodiment of the invention, multipole 153 is positioned between second skimmer 171 and gate electrode 179 (which leads to analytical multipole 169), multipole 153 being entirely positioned within third pumping region 167. Of course, alternative configurations may be used, which include, for example, multipole 153 being positioned across more than one pumping stages, skimmer 171 or exit electrode 179 may be removed or replaced or supplemented by other optic elements such as focusing lens 189 (e.g., Einsel lenses, etc.).

Efficient differential pumping in the pumping regions 165, 166 & 167 allows multipole 153 (the main ion guide/trap) to be in a pressure region having a pressure which is both low enough for ion trapping and high enough for collisional cooling. Such an ion guide may be used in applications requiring either ion trapping (for a specific period of time), ion selecting, ion fragmenting, etc. For example, if the pressure in third pressure region 167 containing multipole 153 is too high, ions may be scattered or fragmented. In a single skimmer system, the effects of this scattering or fragmenting are difficult to manage. Conversely, the presence of more than one skimmer with pre-multipole ion guide 156 in this region minimizes scattering and fragmentation of the sample ions.

Figure 1:
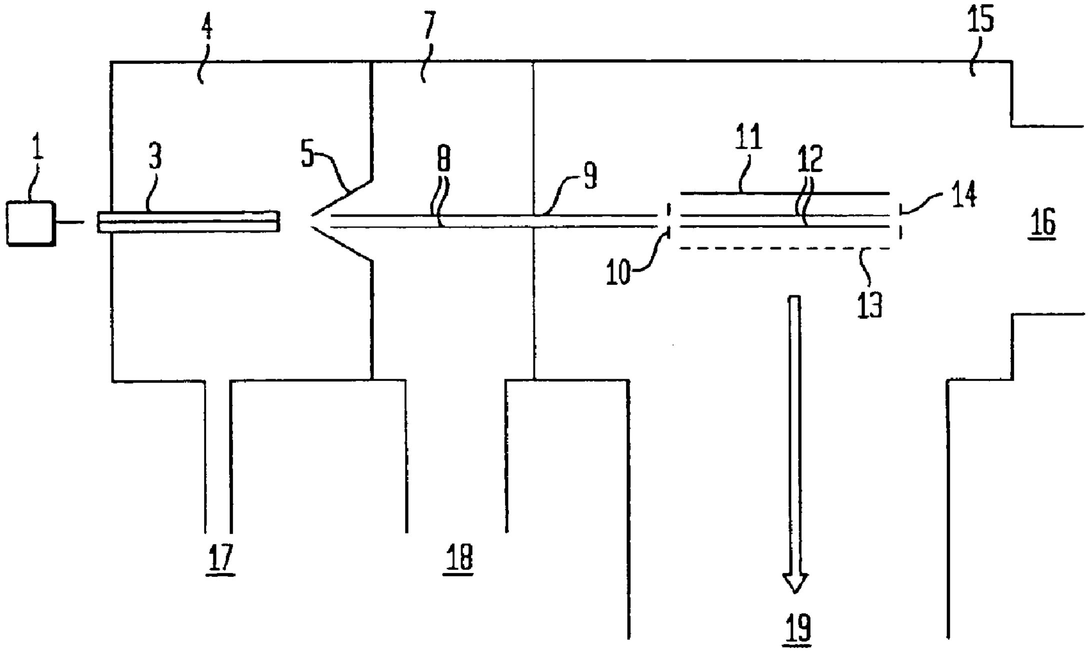
FIG. 1 (PRIOR ART)
FIG. 1 shows a prior art ion trap TOF mass spectrometer according to Franzen U.S. Pat. No. 5,763,878.
Figure 2:
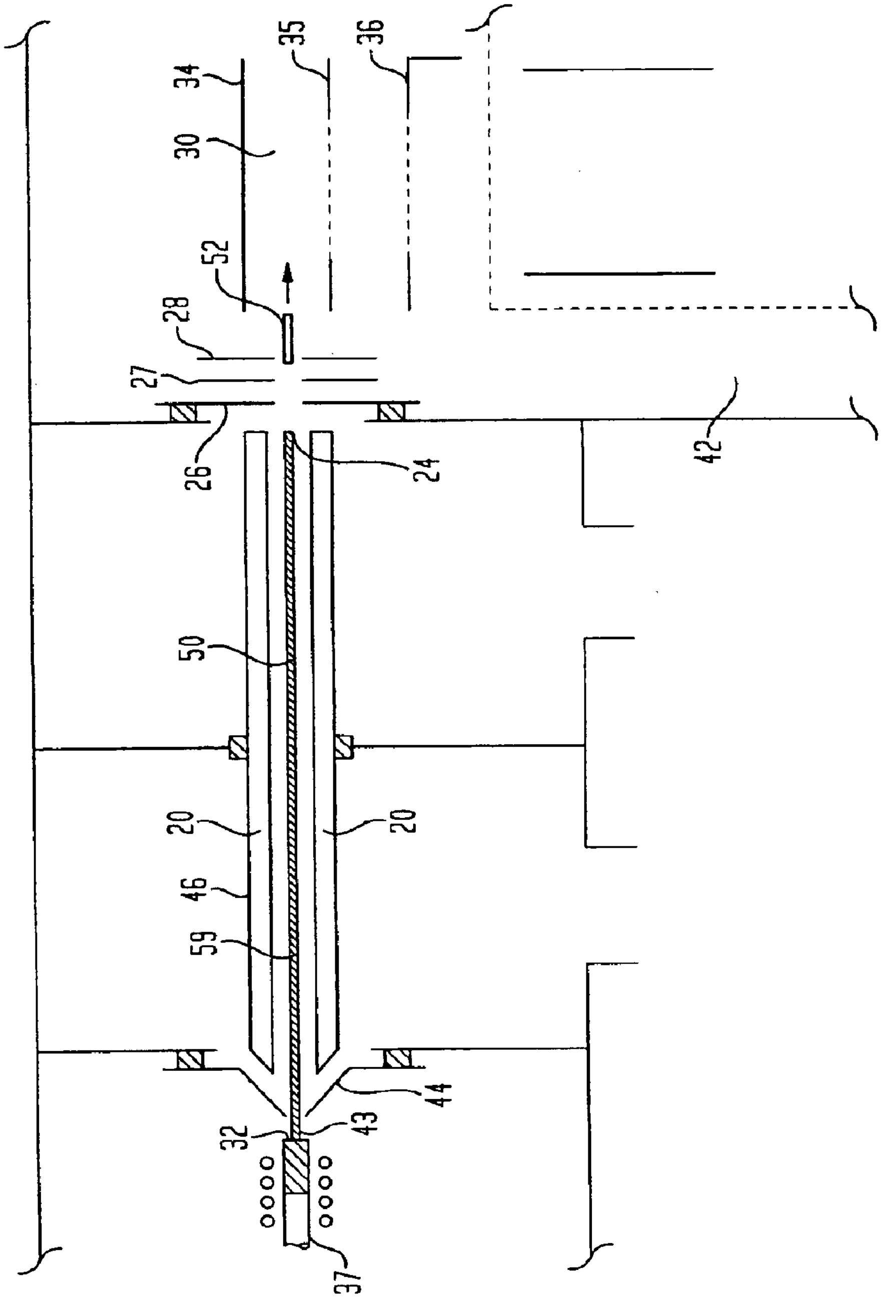
FIG. 2 (PRIOR ART)
FIG. 2 shows a prior art ion trap TOF mass spectrometer according to Whitehouse et al. U.S. Pat. No. 6,011,259.
Figure 3:
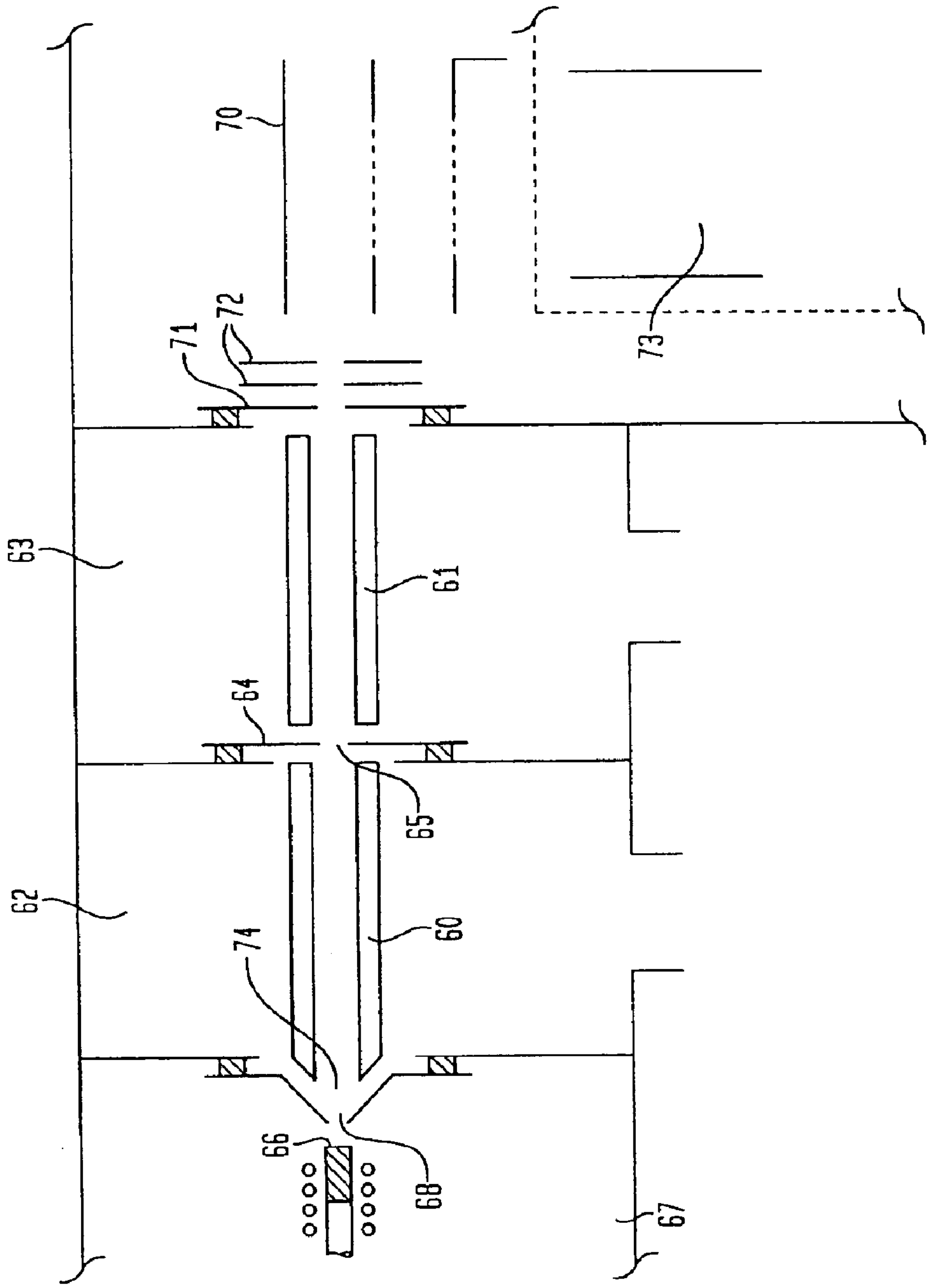
FIG. 3 (PRIOR ART)
FIG. 3 shows a prior art ion trap TOF mass spectrometer according to Whitehouse et al. U.S. Pat. No. 6,011,259.
Figure 4:
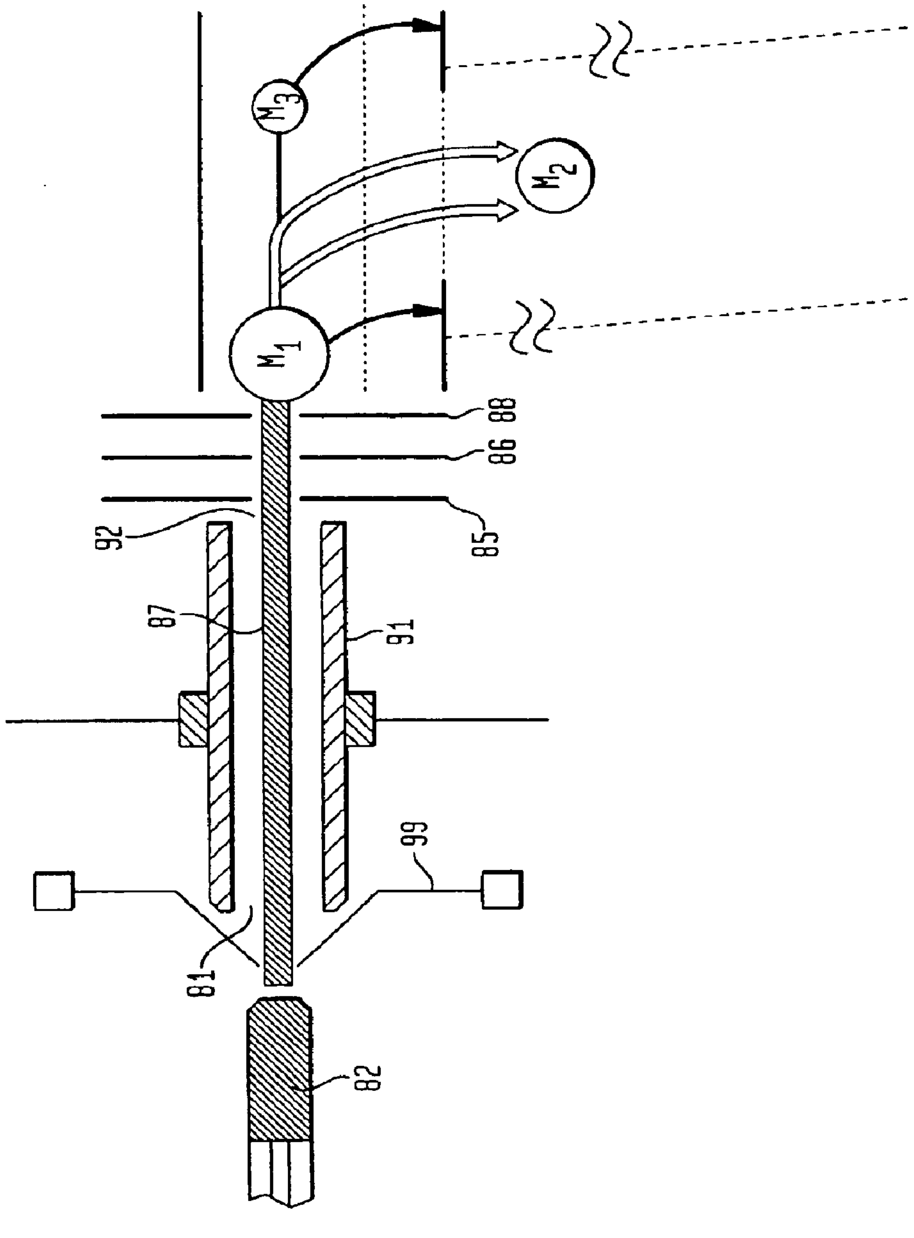
FIG. 4 (PRIOR ART)
FIG. 4 shows a prior art ion trap TOF mass spectrometer according to Dresch et al. U.S. Pat. No. 6,020,586.
Figure 5:
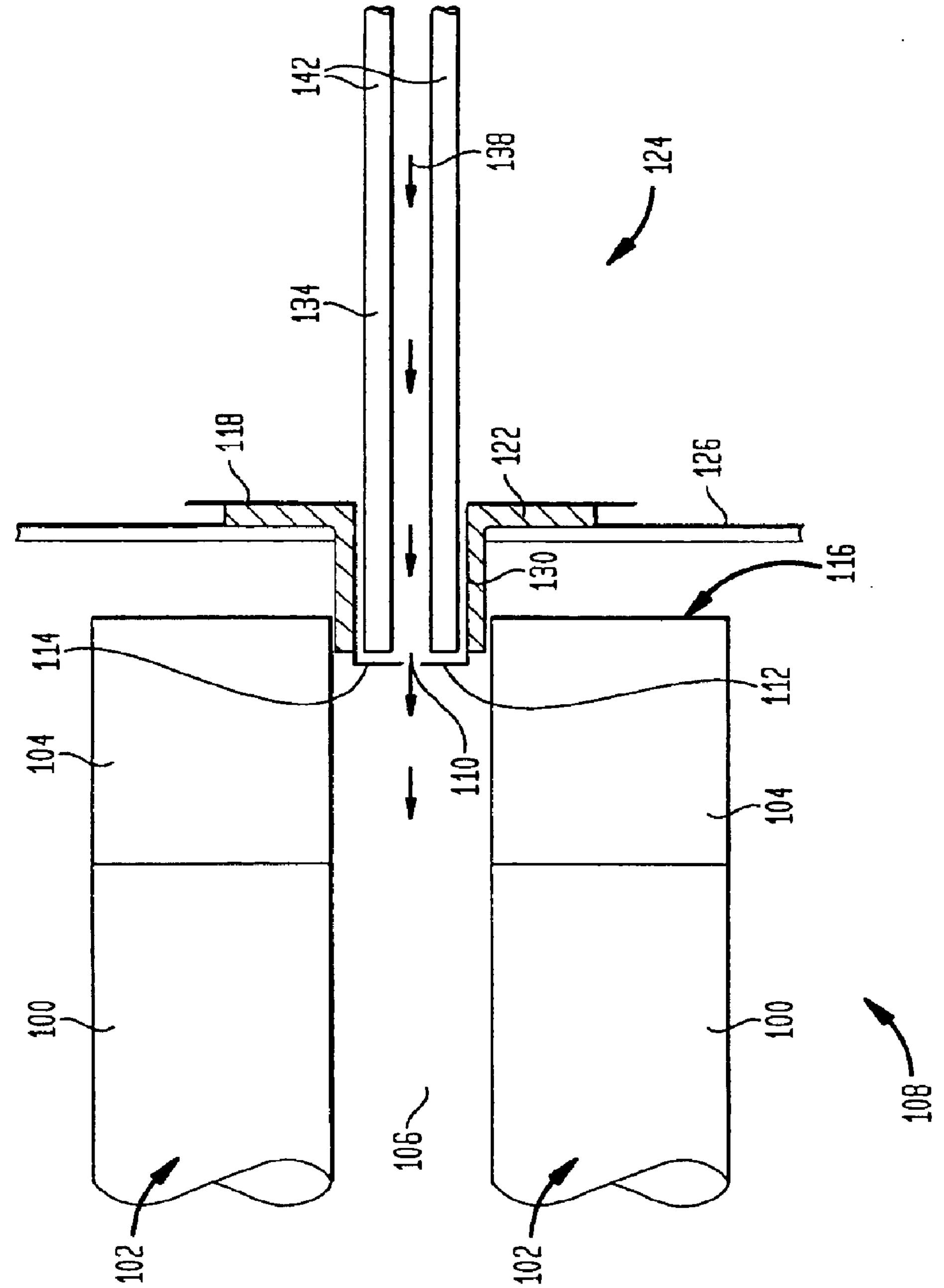
FIG. 5 (PRIOR ART)
FIG. 5 depicts a prior art apparatus according to Whitehouse et al U.S. Pat. No. 6,121,607 wherein a first ion guide extends into a second ion guide.
Figure 7:
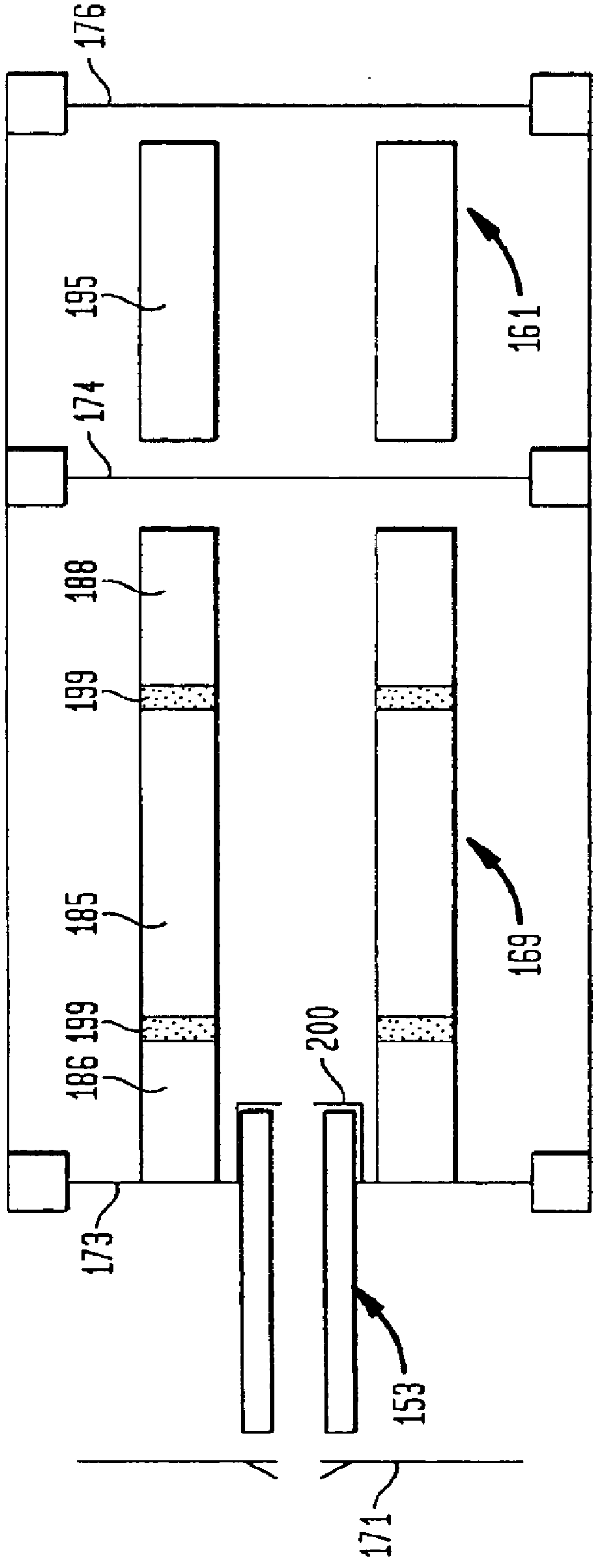
FIG. 7 shows a schematic representation of an alternate embodiment of the dual ion trap mass spectrometer in accordance with the present invention, including first and second ion traps one on either side of an analytical multipole, and wherein the first ion trap is positioned such that it extends within a first section of the analytical multipole.

Then, at some predetermined time after the ions have been trapped within multipole 153, the ions are gated out of multipole 153 by decreasing the potential applied to gate electrode 179 such that the ions are released, or transmitted, into analytical multipole 169. The ion trapping procedure is then repeated by again increasing the potential on gate electrode 179 to trap ions in multipole 153. Alternatively, the exit end of multipole 153 may be positioned such that is extends within the entrance end of pre-multipole section 186 of analytical multipole 169 (as shown generally in FIG. 7). Here, similar to the apparatus shown in FIG. 5, the exit end of multipole 153 comprises an endcap electrode 200 which performs the same functions as gate electrode 179. An advantage of such an embodiment is that loss of ions is minimized because the ions are already within analytical multipole 169 when they exit from multipole/first trap 153.

Turning back to the preferred embodiment, shown in FIG. 6, the released or gated ions are then accelerated and/or focused into analytical multipole 169 by electrode/lens 189 through pumping restriction 173, which may also further focus or accelerate the ions, into a fourth pumping region 168. Preferably, analytical multipole 169 comprises three sections, pre-multipole 186, main multipole 185, and post-multipole 188. Preferably, each multipole section (186, 185 & 188) is a quadrupole (i.e., comprising four parallel conducting electrode rods), although other multipole arrangements may be used (e.g., pentapole, hexapole, septapole, octapole, etc.). Also, in the preferred embodiment, the individual sections of analytical multipole 169 (i.e., pre-multipole 186, main multipole 185, and post-multipole 188)

are separated by insulators 199 such that each section may be held at a different potential. Alternatively, pre-multipole 186, main multipole 185, and post-multipole 188 may be spaced apart from one another.

In MS/MS mode, analytical multipole 169 is used to select ions of a desired mass-to-charge (m/z) ratio for transmission to second trapping multipole 161. This ion selection is effectuated or realized by application of a DC potential between the conducting electrode rods of analytical multipole 169 in addition to the application of the aforementioned RF potential. The potential applied to the conducting electrode rods of the trapping multipoles (153 and/or 161) is RF only in either mode of operation (i.e., in transmission or trapping mode). Ions having a m/z ratio other than the desired m/z (or m/z range) are filtered out of the ion beam by analytical multipole 169, while the selected ions are transmitted to second trapping multipole 161 through pumping restriction and gate electrode 174. Second ion trap 161 preferably also comprises a plurality of conducting electrode rods 195 (e.g., four, five, six, etc.) to form a multipole structure (e.g., quadrupole, hexapole, octapole, etc.).

In this mode of operation, second trapping multipole 161 acts as a collision cell as well as a trap. That is, in MS/MS mode, second trap (collision cell) 161 is filled with a "collision gas" to a pressure of, for example, 0.004 mbar. The DC potential difference between analytical multipole 169 and second trap/collision cell 161 is such that the selected ions are accelerated to a moderate kinetic energy as they are transferred to second trap/collision cell 161 through pumping restriction and gate electrode 174. This results in energetic collisions between the ions and collision gas in second trap/collision cell 161, which may lead to fragmentation of the ions (i.e., into daughter ions). Subsequent collisions between the ions, ion fragments, and collision gas eventually cool the resultant ions to near the temperature of the collision gas—typically room temperature. In either case, "transmission only" or "MS/MS" modes, once the ions are fragmented via CID the ions are transmitted or gated out of second ion trap 161 at a predetermined time by decreasing or switching the potential applied to gate electrode 176 such that the ions are released, or transmitted, into the mass analyzer 163. Preferably, mass analyzer 163 is a time-of-flight (TOF) mass analyzer, which may be positioned such that the flight region thereof is coaxial with (not shown) or orthogonal to (shown) the ion axis of analytical multipole 169, ion traps 153 & 161, etc.

As the ions are gated out from second trap/collision cell 161 by gate electrode 176, additional ion optics 192, 193, 194 (i.e., accelerating or focusing elements) may be employed to further focus and/or accelerate the ions into mass analyzer 163. Mass analyzer 163, as shown, is an orthogonal time-of-flight mass analyzer comprising drift region 160, accelerator 197, multideflector 196, lens 191, reflectron 190 and detector 198. Generally, ions are first introduced into ion accelerator 197 where they are orthogonally accelerated by a plurality of accelerating electrodes having potentials applied thereto. Optionally, and as shown, multideflector 196 may be used to further deflect the ions along the axis of drift region 160 of the TOF analyzer. After one pass through drift region 160, ions may then be further focused by lens 191 as they enter ion reflector 190. The ions are then reflected back into drift region 160 of TOF analyzer 163 where they again pass through multideflector 196 (which further focuses the ions or alternatively is deenergized such that it does not effect the ions) and through ion accelerator 197 (which is now deenergized) such that they strike detector 198 thereby generating a mass spectrum. Alternatively, accelerator 197 may serve as a reflecting device to reflect ions multiple times between reflector 190 and accelerator 197 until such time when accelerator 197 is deenergized so the ions may pass through to detector 198. In addition, any of a number of mass analysis devices may also be used in conjunction with the present invention, including but not limited to quadrupole (Q), Fourier transform ion cyclotron resonance (FTICR), ion trap, magnetic (B), electrostatic (E), ion cyclotron resonance (ICR), quadrupole ion trap analyzers, etc.

Figure 8:
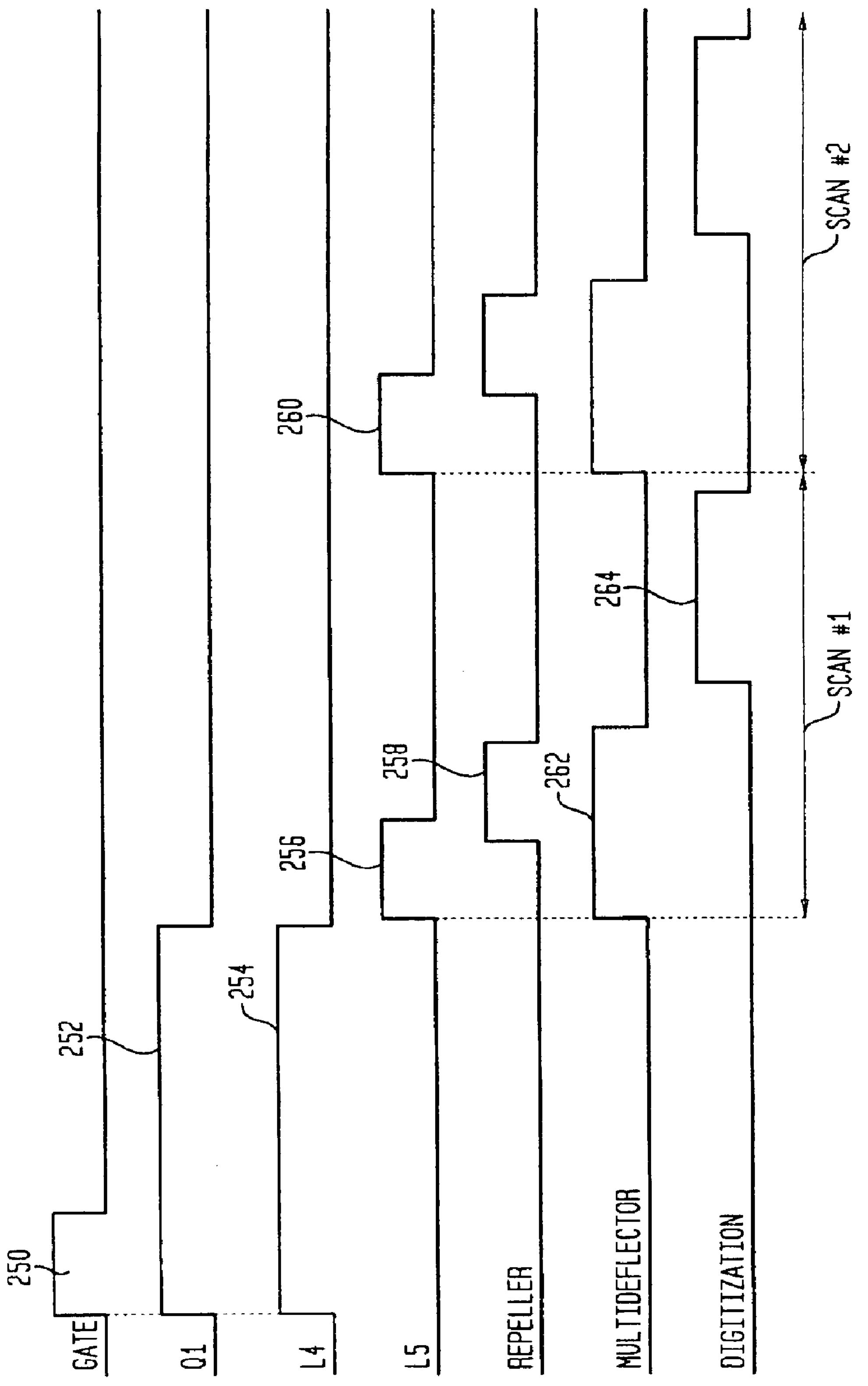
FIG. 8 depicts the timing sequence for the operation of the preferred embodiment of the dual multipole trap time of flight mass spectrometer according to the present invention.

Turning next to FIG. 8, depicted is the timing sequence for the operation of a dual multipole trap time of flight mass spectrometer according to the present invention. A mass spectrum might be composed of the sum of the signals from one or more "scans". The analysis is initiated by releasing ions from the first multipole trap 153—as represented in FIG. 8 by the "high" state on "Gate" trace 250. Ions are released from the first multipole trap 153 by lowering the potential on gate electrode 179 at the exit of first multipole 153. Gate electrode 179 is preferably an apertured metal plate the aperture of which is aligned with the exit of first multipole trap 153. By applying an appropriate repelling potential to gate electrode 179, ions can be trapped in the first multipole trap 153. If the potential on the gate electrode 179 is changed to a neutral or attractive potential, then ions will be released from multipole trap 153.

Simultaneous with the release of ions from multipole trap 153, an RF (and optionally a DC) electric potential is applied between the rods of the analyzer multipole 169—as shown in FIG. 8 by the "high" state on "Q1" trace 252. In transmission only mode, only an RF potential is applied between the analyzer multipole rods 183, 185, 187. In MS/MS mode, both an RF and a DC potential are applied between the analyzer multipole rods 183, 185, 187. The amplitude of the RF and DC potentials is adjusted so as to select a desired m/z range for transmission through the analyzer multipole 169.

Simultaneous with the application of the electrical potential to the analyzer multipole 169, the potenial on "L4" electrode 174 is set so as to allow ions to pass from the analyzer quadrupole 169 to the second multipole trap 161. L4 Electrode 174 is preferably an apertured metal plate the aperture of which is aligned with the exit of the analyzer multiple 169 and the entrance of the second multipole trap 161. By applying an appropriate repelling potential to the L4 electrode 174, ions can be prevented from moving between the analyzer multipole 169 and the second multipole trap 161. If the potential on L4 electrode 174 is changed to a neutral or attractive potential (represented by a "high" state in "L4" trace 254), then ions may pass between the analyzer multipole 169 and the second multipole trap 161.

Once in the second multipole trap 161, the ions are released in either one or a multitude of ion packets corresponding to one or a multitude of "scans". To initiate a scan, a packet of ions is released from the second multipole trap 161 into the mass analyzer 163—preferably a time-of-flight mass analyzer. This is accomplished by pulsing the potential applied to L5 electrode 176. L5 electrode 176 is preferably an apertured metal plate the aperture of which is aligned with the exit of the second multipole trap 161. By applying an appropriate repelling potential to the L5 electrode 176, ions can be trapped in the second multipole trap 161. If the potential on the L5 electrode 194 is changed to a neutral or attractive potential (represented by a "high" state in "L5" trace 256, 260), then ions may pass out of the second multipole trap 161 and into the analyzer 163.

Time is required for the released ions to pass from the second multipole trap 161 to the analyzer 163. The time required is dependent on the m/z ratio of the ions under analysis and the potential difference between the second multipole trap 161 and the analyzer 163. As a result, there is a delay between the release of ions from the second multpole trap 161 and the application of a high voltage pulse to repeller/accelerator 197 (as shown in FIG. 8 as "Repeller" trace 258), which accelerates the ions in the direction of the flight region of time-of-flight analyzer. In the preferred embodiment, the application of a high voltage pulse to the repeller initiates the mass analysis of the ions. Ions in the accelerator of the analyzer at the time of application of the high voltage pulse will be analyzed. Any ions remaining between the second multipole trap and the accelerator or which have passed beyond the accelerator at the time of the application of the high voltage pulse will be lost.

As further depicted in FIG. 8 and demonstrated by "Multideflector" trace 262, a multideflector 196 may be used in the time-of-flight region, which is energized coincidentally with the release of ions from the second multipole trap 161 to further deflect of focus the ions in the direction of the axis of the flight region. That is, while energized, the multideflector deflects ions, as described in U.S. Pat. Nos. 6,107,625 and 5,696,375, onto a trajectory parallel to the TOF analyzer axis. Multideflector 196 must remain energized until all ions of interest have been accelerated out of repeller/accelerator 197.

As is further depicted in FIG. 8 and demonstrated by "Digitization" trace 264, the onset of the digitization of signals produced by detector 198 of the TOF analyzer occurs at some time after repeller/accelerator 197 has been deenergized (compare timing sequence of "Digitization" trace 264 and "Repeller" trace 262). The ions under analysis take time to travel to the ion detector. The time required for ions to reach the detector is dependent on the m/z of the ion higher m/z ions require more time. Thus, the time over which the detector signal is digitized must be chosen according to what m/z range is of interest. If higher m/z ions are of interest then digitization must continue for a longer time.

Once the digitization of ion signals resulting from the first scan are complete, a second scan may be initiated by releasing a second packet of ions from the second multipole trap. The results of the second, and other subsequent, scans may be summed with those of the first scan to produce a single mass spectrum. Once many scans have been made—and therefore many ion packets released from the second multipole trap—the second trap will be empty of ions. Alternatively, it may be desirable after, some period of time, to empty the second trap of ions by gating the potential on L5 for a relatively long period of time, such that the contents of the second trap are allowed to escape. Once the second multipole trap is empty, it may be refilled with ions from the first multipole ion trap. Note that it is important to insure that the second multipole trap is empty before refilling in order that ions from a previous experiment do not contribute to the spectra of later experiments—i.e. to avoid "memory effects".

EXAMPLES

In the following three examples, first multipole trap 153 is a hexapole 120 mm in length, comprising stainless steel rods having a diameter of 0.9 mm. The inner diameter of the hexapole is 2.5 mm. An RF potential of 600 Vpp at 5 MHz is applied between the hexapole rods, while a DC potential of 30 V between the entire hexapole assembly (i.e., to all of the rods) and ground. Next, a potential of 45 V is applied to first gating electrode 179 as a potential barrier to keep ions inside hexapole trap 153.

Analyzer multipole 169, in this example, is a quadrupole mass filter with pre and post filters. Rods 185 of quadrupole 169, including pre and post filters, are 200 mm long and have a diameter of 9.5 mm. The inner diameter of quadrupole 169 is 8.26 mm. Here, a DC potential of 15 V is applied to all rods 185, while an RF potential having a frequency of 0.88 MHz and 380 Vpp is applied between rods 185. Second multipole trap 161, in this example, is also a quadrupole having the same dimensions as the analyzer quadrupole 169. Again, the same potentials are applied to linear quadrupole trap 161 as described above for analyzer quadrupole 169. However, linear quadrupole trap 161 may be operated either with or without collision gas, but, in the present example and while obtaining the data presented below, the pressure of collision gas in linear quadrupole trap 161 was held at $4\times10^{-3}$ mbar. The pressure in hexapole 153 was held at $3\times10^{-3}$ mbar and the pressure in analyzer quadrupole 169 was held at $4\times10^{-5}$ mbar. The experimental results from such a device will now be discussed.

EXAMPLE 1

Figure 9:
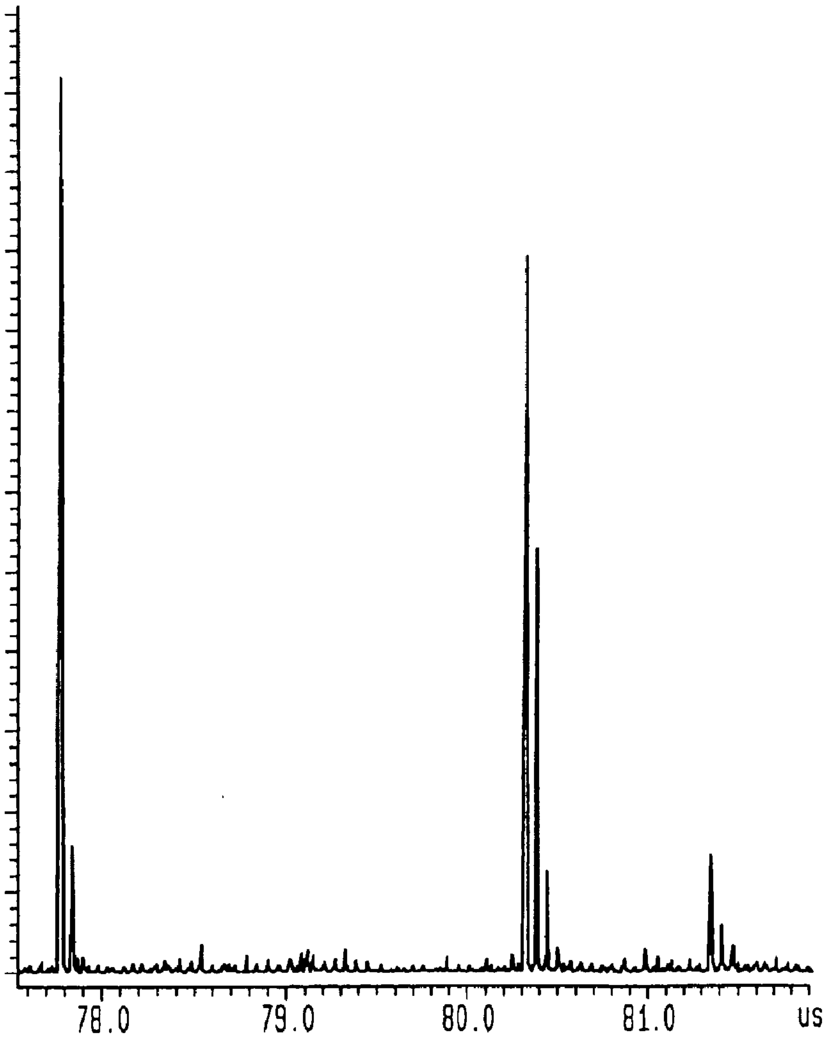
FIG. 9 is a mass spectrum of HP tune mix obtained with the preferred embodiment of the dual multipole trap time of flight mass spectrometer according to the present invention.

Referring first to FIG. 9, shown is a mass spectrum of HP tune mix obtained using the preferred embodiment of the dual multipole ion trap time-of-flight mass spectrometer according to the present invention. The spectrum shown was obtained under the conditions described above and with the timing as shown and described with respect to FIG. 8. In obtaining this spectrum, the potential of electrode 179 was lowered to 0V for 200 usec to release ions from hexapole 153. Simultaneously, quadrupole 169 was turned "on" and kept on for about 1200 usec and electrode 174 was brought from 120 V (blocking potential) to −50 V and held there for 200 usec to allow ions to pass into quadrupole trap 161. Afterwards, electrode 176 was brought to from 35 V (blocking potential) to ground potential to allow ions to pass out of quadrupole trap 161 and into the TOF mass analyzer. Second gating electrode 176 was held open for about 99 ms. Approximately 75 usec after opening gating electrode 176, repeller/accelerator 197 of the orthogonal interface was pulsed from ground to 7500 V: so as to accelerate ions into drift region 160 of TOF analyzer 163. Repeller/accelerator 197 was maintained at 7500 V for about 20 usec so as to accelerate all ions into drift region 160.

Simultaneous with the release of ions from quadrupole trap 161—i.e. when electrode 176 was brought to ground—multideflector 196 was energized and maintained at potential until about 10 usec after repeller/accelerator 197 was deenergized. Multideflector 196 is used to deflect ions onto the axis of TOF analyzer 163 and thereby onto a trajectory which lead the ions to detector 198. Approximately 80 usec after the initial acceleration of the ions, i.e. the leading edge of the repeller pulse, the digitizer began digitizing the detector signal, which continued for about 50 usec.

In the example described above, only one scan was made per experiment. That is, all of the ions released or gated from hexapole 153 were released from quadrupole trap 161 as a single packet of ions rather than a multitude of packets and only one TOF mass analysis was performed on these ions. The sequence of events shown in FIG. 8 was repeated at a rate of 10 Hz for a total of 500 times. The results were then summed into a single spectrum, depicted in FIG. 9.

EXAMPLE 2

Figure 10:
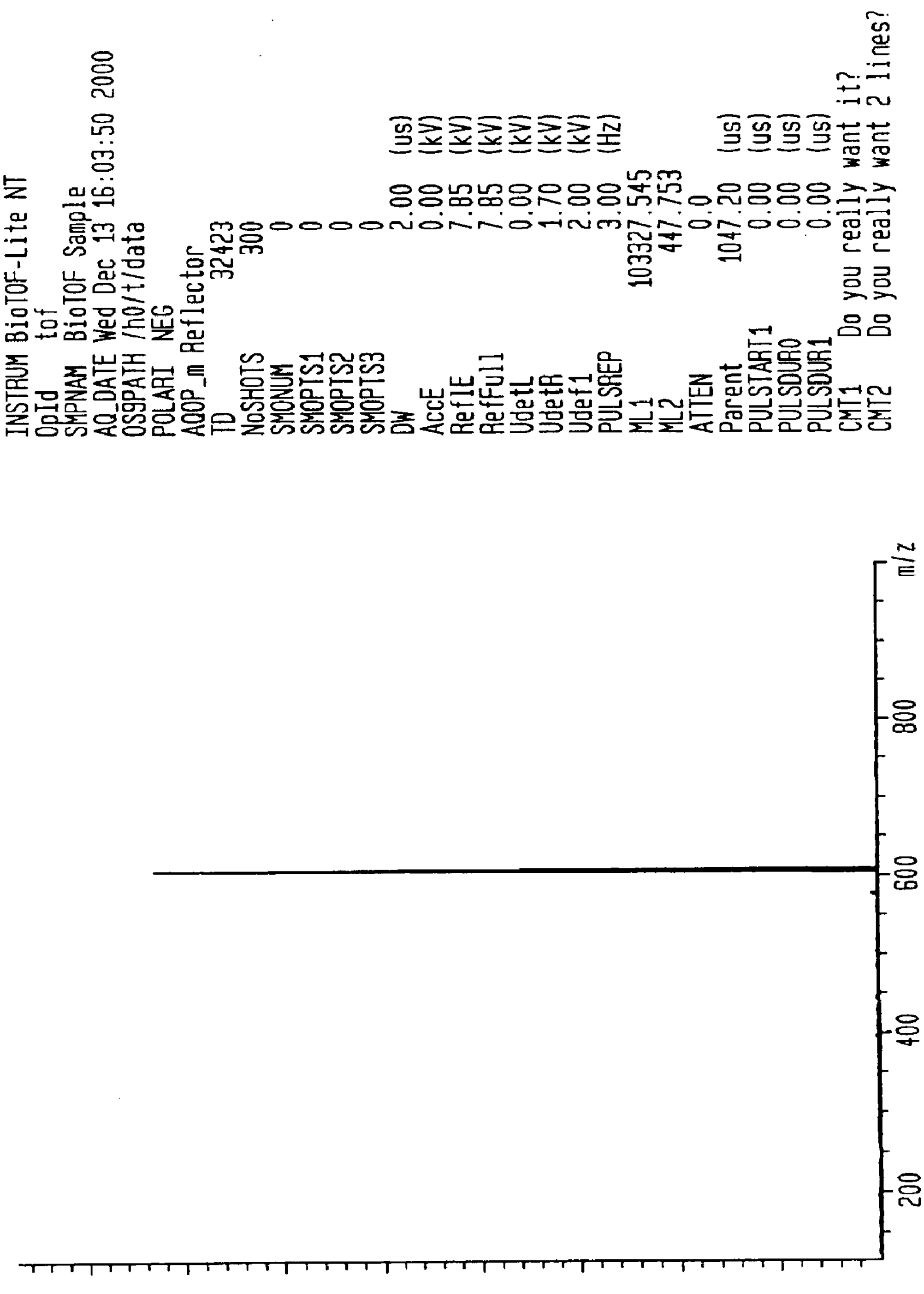
FIG. 10 is a mass spectrum demonstrating the selection of the molecular ion of rescerpine and subsequent time-of-flight mass analysis using a dual multipole trap time of flight mass spectrometer according to the present invention.

Turning next to FIG. 10, shown is a mass spectrum demonstrating the selection of the molecular ion of rescerpine and the subsequent time-of-flight mass analysis using a dual multipole trap time-of-flight mass spectrometer according to the present invention. The potentials applied and the timing of events were all the same as described above for EXAMPLE 1 except the RF potential applied between analyzer quadrupole rods 185 was 1144 Vpp, Also, a DC potential of 192 V was applied between analyzer quadrupole rods 185 so as to select ions of m/z=609 amu for transmission. Finally, the analyzer quadrupole 169 was maintained in an "on" state and electrode 174 in the "open" state for 900 usec instead of 1200 usec.

EXAMPLE 3

Figure 11:
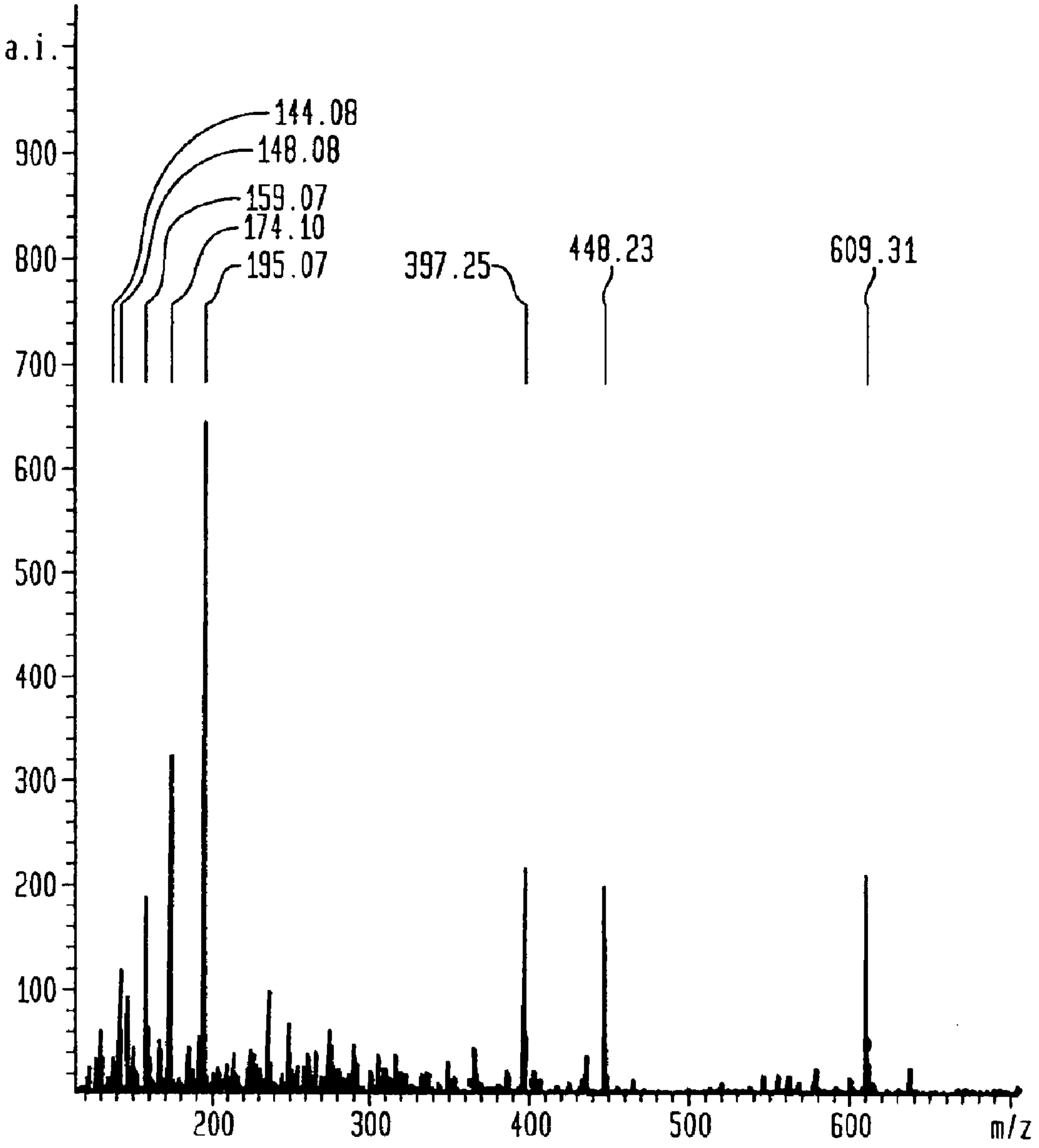
FIG. 11 is a fragmention spectrum obtained from rescerpine using the preferred embodiment of the dual multipole trap time of flight mass spectrometer according to the present invention.

Referring now to FIG. 11, shown is a fragment ion spectrum obtained from rescerpine using the preferred embodiment of the dual multipole trap time of flight mass spectrometer according to the present invention. The conditions in EXAMPLE 2 with respect to FIG. 10 were maintained except that hexapole 153 was held at a DC level of 10 V and analyzer quadrupole 169 was held at a DC level of 95 V. The open and closed states of electrode 179 were changed to 80 V and 125 V, respectively. The open and closed states of electrode 174 were changed to 30 V and 200 V, respectively. The open and closed states of electrode 184 were changed to 0 V and 100 V, respectively. Finally, the analyzer quadrupole was maintained in an "on" state and electrode 174 in the "open" state for 900 usec instead of 200 usec.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method for analyzing sample ions, said method comprising the steps of:

generating ions from an ionization source;

introducing said ions into a first ion trap;

trapping said ions in said first ion trap for a first predetermined time;

releasing said ions from said first ion trap such that said ions are transferred into an analytical multipole;

selecting said ions of desired mass to charge ratio using said analytical multipole;

trapping said selected ions within a second ion trap for a second predetermined time; and releasing said selected ions from said second ion trap such that said selected ions are transferred into a mass analyzer for analysis;

wherein said analytical multipole may be switchably powered on for a third predetermined time.

2. The method of claim 1, wherein said analytical multipole is energized just before the end of said first predetermined time.

3. The method of claim 1, wherein said ionization source is selected from the group consisting of electrospray, matrix-assisted laser desorption ionization, atmospheric pressure ionization, plasma desorption, electron ionization, and chemical ionization.

4. The method of claim 1, wherein said mass analyzer is selected from the group consisting of time-of-flight mass analyzer, quadrupole mass analyzer, fourier transform ion cyclotron resonance mass analyzer, ion trap mass analyzer, magnetic mass analyzer, electrostatic mass analyzer, ion cyclotron resonance mass analyzer, quadrupole ion trap mass analyzer, and quadrupole time-of-flight mass analyzer.

5. The method of claim 1, wherein a second group of ions is released from said first ion trap into said analytical multipole only after said selected ions have been transferred into said mass analyzer from said second ion trap.

6. The method of claim 1, wherein at least one ion transfer device is positioned between said ionization source and said first ion trap.

7. The method of claim 1, wherein said trapping and said selecting occur within a single pressure region.

8. The method of claim 1, wherein said trapping and said selecting occur within separate pressure regions.

9. The method of claim 1, wherein said ionization source is positioned coaxial with said first ion trap.

10. The method of claim 1, wherein said ionization source is positioned orthogonal to said first ion trap.

11. The method of claim 1, wherein said first ion trap is positioned in a first pressure region, said analytical multipole is positioned in a second pressure region, and said second ion trap is positioned in a third pressure region.

12. The method of claim 11, wherein said first pressure region is at a pressure in the range of $1\times10^{-3}$ mbar to $1\times10^{-2}$ mbar.

13. The method of claim 11, wherein said second pressure region is at a pressure in the range of $1\times10^{-5}$ mbar to $1\times10^{-3}$ mbar.

14. The method of claim 11, wherein said third pressure region is at a pressure equal to or lower than the pressure of said second pressure region, said pressure being in the range of $1\times10^{-5}$ mbar to $1\times10^{-3}$ mbar.

15. A method for analyzing sample ions, said method comprising the steps of:

generating ions from a sample material;

introducing said ions into a first ion trap, said first ion trap trapping said ions for a first predetermined period of time;

energizing an analytical multipole at the end of said first predetermined period of time;

releasing said ions from said first ion trap into said analytical multipole selecting said ions of desired mass to charge ratio using said analytical mulitpole;

trapping said selected ions within a second ion trap for a second predetermined time;

deenergizing said analytical multipole at the end of a third predetermined time; and releasing said selected ions from said second ion trap into a mass analyzer.

16. The method of claim 15, wherein said analytical multipole is energized just before the end of said first predetermined time.

17. The method of claim 15, wherein said scobd in trap is used to fragment said selected ions.

18. The method of claim 17, wherein said fragmented ions are released from said second ion trap such that said fragmented ions are transferred into said mass analyzer.

19. The method of claim 15, wherein a second group of ions is released from said first ion trap into said analytical multipole only after said selected ions have been transferred into said mass analyzer from said second ion trap.

20. The method of claim 15, wherein at least one ion transfer device is positioned between said ion source and said first ion trap.

21. The method of claim 15, wherein said trapping and said selecting occur within a single pressure region.

22. The method of claim 15, wherein said trapping and said selecting occur in separate pressure regions.

23. The method of claim 15, wherein said mass analyzer is selected from the group consisting of time-of-flight mass analyzer, quadrupole mass analyzer, fourier transform ion cyclotron resonance mass analyzer, ion trap mass analyzer, magnetic mass analyzer, electrostatic mass analyzer, ion cyclotron resonance mass analyzer, quadrupole ion trap mass analyzer, and quadrupole time-of-flight mass analyzer.

24. The method of claim 15, wherein ions are generated from said sample material using an ionization source that is selected from the group consisting of electrospray ion source, matrix-assisted laser desorption ionization source, atmospheric pressure ionization source, plasma desorption ion source, electron ionization source, and chemical ionization source.

25. The method of claim 24, wherein said ionization source is positioned coaxial to said first ion trap.

26. The method of claim 24, wherein said ionization source is positioned orthogonal to said first ion trap.

27. The method of claim 15, wherein said first ion trap is positioned in a first pressure region, said analytical multipole is positioned in a second pressure region, and said second ion trap is positioned within a third pressure region.

28. The method of claim 27, wherein said first pressure region is maintained at a pressure of $1\times10^{-3}$ mbar to $1\times10^{-2}$ mbar.

29. The method of claim 27, wherein said second pressure region is at a pressure of $1\times10^{-5}$ mbar to $1\times10^{-3}$ mbar.

30. The method of claim 27, wherein said third pressure region is at a pressure equal to or lower than the pressure of said second pressure region, said pressure being in the range of $1\times10^{-5}$ mbar to $1\times10^{-3}$ mbar.

31. A method for analyzing sample ions, said method comprising the steps of:

(a) generating a first group of ions from a first sample material;

(b) introducing said first group of ions into a first ion trap, said first ion trap trapping said first group of ions for a first predetermined period of time;

(c) energizing a multipole just before the end of said first predetermined period of time, said multipole being energized for a second predetermined period of time;

(d) releasing said first group of ions from said first ion trap into said multipole, selecting said ions of desired mass to charge ratio using said multipole;

(e) trapping said selected ions from said first group of ions within a second ion trap for a third predetermined period of time;

(f) deenergizing said multipole at the end of said second predetermined time;

(g) releasing said selected ions from said first group of ions from said second ion trap into a mass analyzer, (h) generating a second group of ions from a second sample material;

(i) introducing said second group of ions into said first ion trap during said second period of predetermined time, said first ion trap trapping said second group of ions for a fourth predetermined time; and (j) repeating steps (c) through (g).

32. The method of claim 31, wherein said selected ions are fragmented while in said second ion trap.

33. The method of claim 31, wherein said fragmented ions are released from said second ion trap such that said fragmented ions are transferred into said mass analyzer.

34. The method of claim 31, wherein said second group of ions is released from said first ion trap into said multipole only after said selected ions have been transferred into said mass analyzer from said second ion trap.

35. The method of claim 31, wherein at least one ion transfer device is positioned between said ionization source and said first ion trap.

36. The method of claim 31, wherein said trapping and said selecting occur in a single pressure region.

37. The method of claim 31, wherein said trapping and said selecting occur in separate pressure regions.

38. The method of claim 31, wherein said mass analyzer is selected from the group consisting of time-of-flight mass analyzer, quadrupole mass analyzer, fourier transform ion cyclotron mass analyzer, ion trap mass analyzer, magnetic mass analyzer, electrostatic mass analyzer, ion cyclotron resonance mass analyzer, quadrupole ion trap mass analyzer, and quadrupole time-of-flight mass analyzer.

39. The method of claim 31, wherein ions are generated from said sample material using an ionization source is selected from the group consisting of an electrospray ionization source, matrix-assisted laser desorption ionization source, atmospheric pressure ionization source, plasma desorption ionization source, electron ionization source, and chemical ionization source.

40. The method of claim 39, wherein said ionization source is positioned coaxial to said first ion trap.

41. The method of claim 39, wherein said ionization source is positioned orthogonal to said first ion trap.

42. The method of claim 31, wherein said first ion trap is positioned in a first pressure region, said analytical multipole is positioned in a second pressure region, and said second ion trap is positioned is a third pressure region.

43. The method of claim 42, wherein said first pressure region is at a pressure of $1\times10^{-3}$ mbar to $1\times10^{-2}$ mbar.

44. The method of claim 42, wherein said second pressure region is maintained at a pressure of $1\times10^{-5}$ mbar to $1\times10^{-3}$ mbar.

45. The method of claim 42, wherein said third pressure region is at a pressure equal to or lower than the second pressure region, said pressure being in the range of $1\times10^{-5}$ mbar to $1\times10^{-3}$ mbar.

* * * * *